(12) United States Patent
Kissa et al.

(10) Patent No.: US 10,295,849 B2
(45) Date of Patent: May 21, 2019

(54) OPTICAL MODULATOR

(71) Applicant: Lumentum Operations LLC, Milpitas, CA (US)

(72) Inventors: Karl Kissa, Gilroy, CA (US); Siu Kwan Cheung, San Jose, CA (US); David M. Shemo, Avon, CT (US); David Glassner, Morgan Hill, CA (US); Ed L. Wooten, San Jose, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/796,170

(22) Filed: Oct. 27, 2017

(65) Prior Publication Data

US 2018/0173026 A1    Jun. 21, 2018

Related U.S. Application Data

(60) Provisional application No. 62/435,282, filed on Dec. 16, 2016.

(51) Int. Cl.
*G02F 1/035* (2006.01)
*G02F 1/03* (2006.01)
*G02F 1/225* (2006.01)

(52) U.S. Cl.
CPC .......... *G02F 1/0316* (2013.01); *G02F 1/0305* (2013.01); *G02F 1/035* (2013.01); *G02F 1/0356* (2013.01); *G02F 1/225* (2013.01); *G02F 1/2255* (2013.01); *G02F 2201/12* (2013.01)

(58) Field of Classification Search
None
See application file for complete search history.

(56) References Cited

U.S. PATENT DOCUMENTS

| 5,138,480 A | 8/1992 | Dolfi et al. |
| 5,408,566 A | 4/1995 | Eda et al. |
| 5,416,859 A | 5/1995 | Burns et al. |

(Continued)

OTHER PUBLICATIONS

Zhang et al., "Attenuation Characteristics of Coplanar Waveguides at Subterahertz Frequencies", IEEE Transactions on Microwave Theory Techniques, vol. 53, No. 11, Nov. 2005, 7 pages.

(Continued)

*Primary Examiner* — Michael Stahl
(74) *Attorney, Agent, or Firm* — Harrity & Harrity, LLP

(57) ABSTRACT

An optical modulator may include at least one ground electrode. The optical modulator may include at least one signal electrode parallel to the at least one ground electrode. The optical modulator may include at least one waveguide parallel to the at least one ground electrode and the at least one signal electrode. The optical modulator may include a first substrate disposed underneath the at least one ground electrode and the at least one signal electrode relative to a surface of the optical modulator. The optical modulator may include a second substrate disposed underneath at least a portion of the first substrate relative to the surface of the optical modulator. The optical modulator may include a floating conductor disposed between the first substrate and the second substrate.

20 Claims, 23 Drawing Sheets

(56) References Cited

U.S. PATENT DOCUMENTS

| | | | | |
|---|---|---|---|---|
| 5,502,780 | A * | 3/1996 | Rangaraj | G02F 1/0356 385/2 |
| 5,530,777 | A * | 6/1996 | Enokihara | G02F 1/0356 385/2 |
| 6,069,729 | A * | 5/2000 | Gill | G02F 1/035 359/245 |
| 6,646,776 | B1 * | 11/2003 | Cheung | G02F 1/2255 359/254 |
| 6,674,565 | B2 | 1/2004 | Kondo et al. | |
| 6,819,851 | B2 | 11/2004 | Aoki et al. | |
| 7,171,063 | B2 | 1/2007 | Feke et al. | |
| 7,502,530 | B2 * | 3/2009 | Kondo | G02F 1/0356 385/1 |
| 7,701,630 | B2 | 4/2010 | Kissa et al. | |
| 7,873,244 | B2 * | 1/2011 | Kinpara | G02F 1/0356 385/1 |
| 7,912,326 | B2 * | 3/2011 | Oikawa | G02F 1/0356 359/245 |
| 9,804,475 | B1 * | 10/2017 | Parker | G02F 1/2255 |
| 2003/0044100 | A1 * | 3/2003 | Kondo | G02F 1/0356 385/3 |
| 2010/0195953 | A1 * | 8/2010 | Miyatake | G02F 1/0316 385/14 |
| 2013/0266253 | A1 * | 10/2013 | Macario | G02F 1/035 385/2 |
| 2014/0270617 | A1 * | 9/2014 | Muller | G02F 1/0115 385/3 |

OTHER PUBLICATIONS

Hotta et al., "Efficient FDTD Analysis of Conductor-Backed CPW's with Reduced Leakage Loss", IEEE Transactions on Microwave Theory and Techniques, vol. 47, No. 8, Aug. 1999, 3 pages.

Schnieder et al., "Modeling Dispersion and Radiation Characteristics of Conductor-Backed CPW With Finite Ground Width", IEEE Transactions on Microwave Theory and Techniques, vol. 51, No. 1, Jan. 2003, 7 pages.

Aoki et al., "High-Performance Optical Modulator With a Wide Center Electrode and Thin x-Cut LiNbO$_3$ Substrate", IEEE Photonics Technology Letters. vol. 16, No. 12, Dec. 2004, 3 pages.

Kawanishi et al., "High-speed dual-parallel Mach-Zehnder modulator using thin lithium niobate substrate", IEEE, 2008, 9 pages.

* cited by examiner

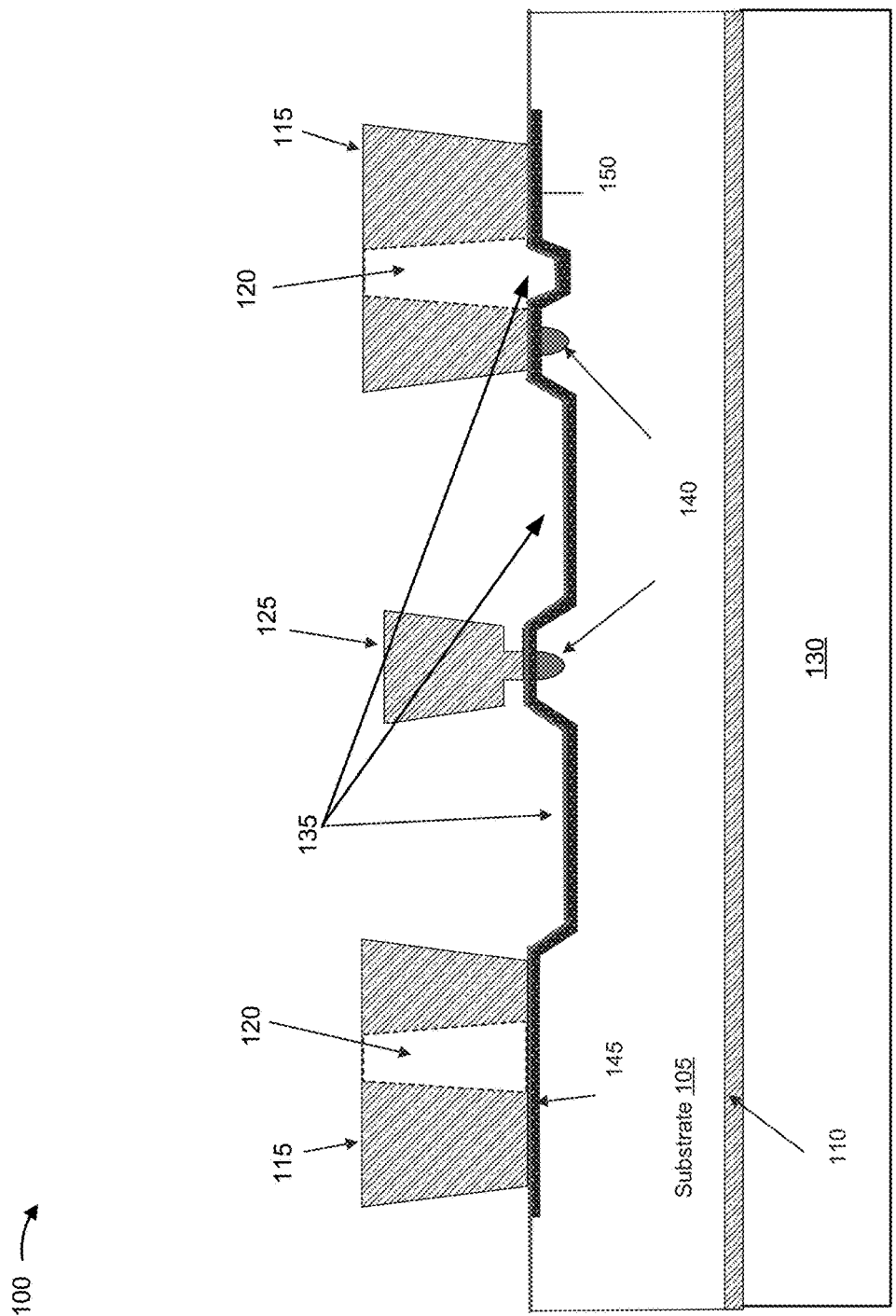

OPTICAL MODULATOR

RELATED APPLICATION(S)

This application claims priority under 35 U.S.C. § 119 to U.S. Provisional Patent Application No. 62/435,282, filed on Dec. 16, 2016, the content of which is incorporated by reference herein in its entirety.

TECHNICAL FIELD

The present disclosure relates to optical modulators. More particularly, some aspects of the present disclosure relate to an optical modulator that includes a conductor to reduce radio frequency (RF) loss by reducing a coupling to substrate modes and to improve isolation of coplanar waveguides.

BACKGROUND

An optical modulator, such as an electro-optical modulator, may modulate a beam. The optical modulator may include a z-cut lithium niobate (LN) substrate, a set of radio frequency (RF) signal electrodes, a set of ground electrodes, and a set of coplanar waveguides to modulate the beam. The set of coplanar waveguides can be part of a Mach-Zehnder (MZ) interferometer. For example, the optical modulator may be configured to use a nested quad-parallel MZ interferometer based modulator (QPMZM) waveguide topology. An optical modulator with coplanar waveguides may cause RF dielectric modes and parallel-plate modes to be excited within the substrate. RF power in the fundamental electromagnetic mode of the set of coplanar waveguides can couple to the substrate modes, which may cause RF loss and/or resonant dips in an optical modulator frequency response. The resonance frequencies of the substrate modes are based on the dimensions of the substrate. For example, the resonance frequencies shift toward higher frequencies as the dimensions of the substrate are reduced toward smaller dimensions.

Thus, in some cases, reducing the substrate thickness causes the RF loss and the resonances to shift to a higher frequency, which may be outside of an operating frequency range of the optical modulator, thereby obviating a negative impact to performance of the optical modulator. However, reducing a substrate thickness may reduce mechanical durability of the optical modulator and may increase a difficulty of manufacture by reducing mechanical rigidity of the optical modulator. Accordingly, it would be advantageous if an optical modulator could be configured to suppress parasitic RF modes (e.g., which cause the RF loss) with a substrate greater than a threshold thickness to ensure mechanical rigidity and mechanical durability.

SUMMARY

According to some possible implementations, an optical modulator may include at least one ground electrode. The optical modulator may include at least one signal electrode parallel to the at least one ground electrode. The optical modulator may include at least one waveguide parallel to the at least one ground electrode and the at least one signal electrode. The optical modulator may include a first substrate disposed underneath the at least one ground electrode and the at least one signal electrode relative to a surface of the optical modulator. The optical modulator may include a second substrate disposed underneath at least a portion of the first substrate relative to the surface of the optical modulator. The optical modulator may include a floating conductor disposed between the first substrate and the second substrate.

According to some possible implementations, an optical modulator may include a laminated substrate including a plurality of waveguides disposed a threshold distance from a surface of the laminated substrate. The laminated substrate may include a conductor layer to suppress radio frequency (RF) dielectric modes and parallel-plate modes within the laminated substrate. The optical modulator may include a plurality of ground electrodes disposed on the surface of the laminated substrate. The optical modulator may include a plurality of signal electrodes disposed on the surface of the laminated substrate.

According to some possible implementations, an optical modulator may include a set of ground electrodes. The optical modulator may include a signal electrode corresponding to and parallel to the set of ground electrodes. The optical modulator may include a set of waveguides corresponding to and parallel to the set of ground electrodes. A first waveguide, of the set of waveguides, may be disposed underneath a ground electrode, of the set of ground electrodes, relative to a surface of the optical modulator. A second waveguide, of the set of waveguides, may be disposed underneath the signal electrode relative to the surface of the optical modulator. The optical modulator may include a first substrate disposed underneath the set of ground electrodes and the signal electrode relative to the surface of the optical modulator. The optical modulator may include a second substrate disposed underneath at least a portion of the first substrate relative to the surface of the optical modulator. The optical modulator may include a conductor disposed between the first substrate and the second substrate.

BRIEF DESCRIPTION OF THE DRAWINGS

FIGS. 1A and 1B are diagrams of an overview of an example implementation described herein;

DETAILED DESCRIPTION

The following detailed description of example implementations refers to the accompanying drawings. The same reference numbers in different drawings may identify the same or similar elements.

An optical modulator may operate at a particular frequency range. For example, the optical modulator may operate in a frequency range greater than approximately 30 gigahertz (GHz) and less than approximately 50 GHz. The optical modulator may include a set of coplanar waveguides of a Mach-Zehnder interferometer. However, the set of coplanar waveguides may excite radio frequency (RF) dielectric modes and parallel-plate modes within a substrate of the optical modulator. Excitation of the RF dielectric modes and parallel-plate modes may cause parasitic losses, such as from RF loss and resonant dips in a frequency response of the optical modulator. Reducing a thickness of the substrate of the optical modulator may increase a frequency for RF loss and resonance so that the frequency is not within the operating band of the optical modulator, thereby reducing a negative impact to performance of the optical modulator. However, reducing the thickness of the substrate may reduce a mechanical rigidity of the substrate, thereby increasing a difficulty of manufacture, a durability of the optical modulator, or the like. Some implementations, described herein, may provide an optical modulator with suppressed parasitic losses and a threshold level of mechanical rigidity.

Figure 1B:
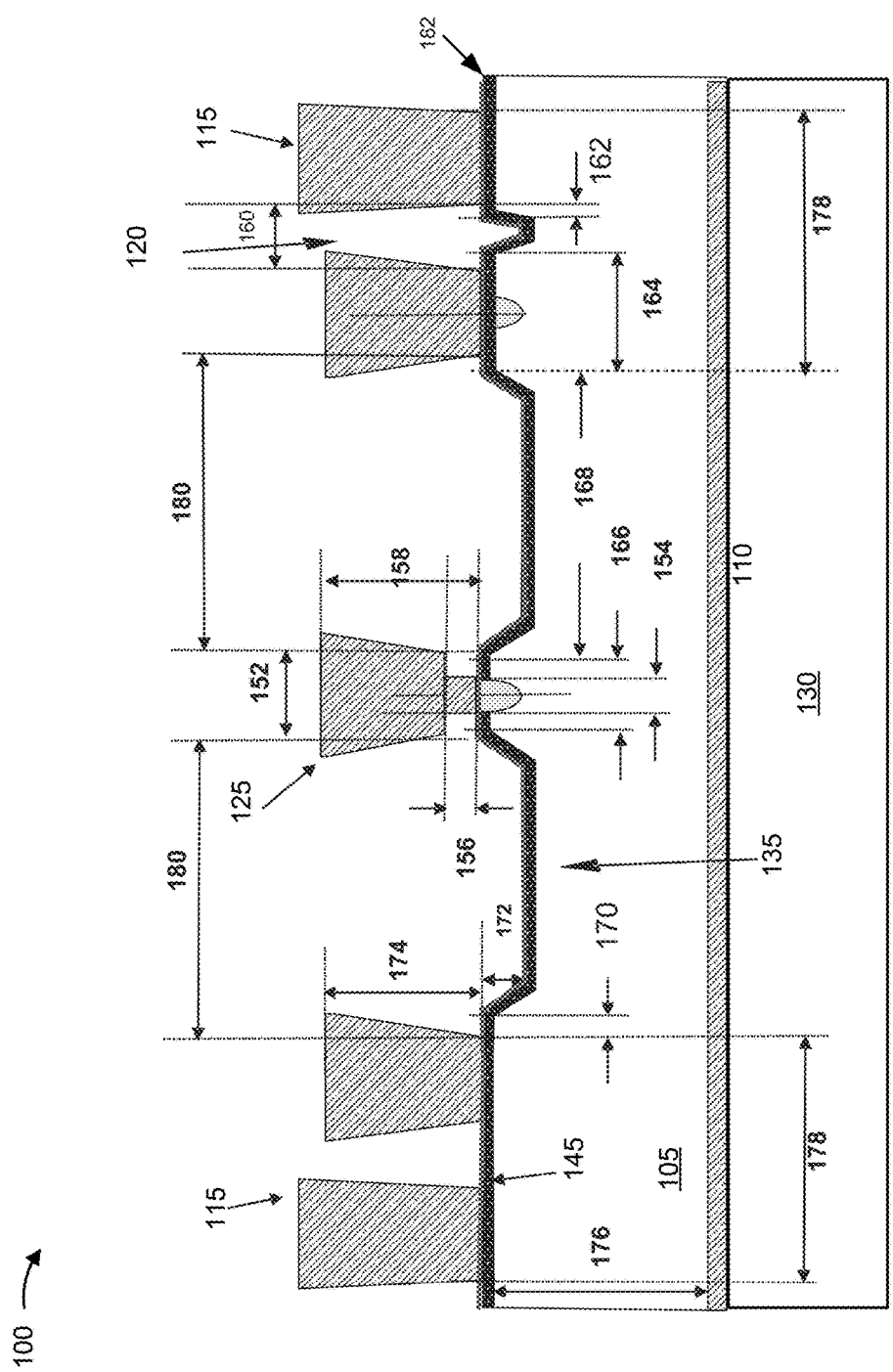

FIGS. 1A and 1B are diagrams of an overview of an example implementation 100 described herein. As shown in FIG. 1A, an optical modulator may include a substrate 105, a floating conductor 110, a set of ground electrodes 115, a set of ground electrode slots 120, a signal electrode 125, a carrier substrate 130, a set of substrate slots 135, a set of waveguides 140, a buffer layer 145, and a bleed layer 150.

Substrate 105 may be a first substrate layer of the optical modulator and may be manufactured from a lithium niobate (LN) material. For example, substrate 105 may include a z-cut lithium niobate substrate. Additionally, or alternatively, substrate 105 may be another material, such as indium phosphide (InP), gallium arsenide (GaAs), silicon (Si), a polymer, or the like. Floating conductor 110 may be a conductor layer to reduce coupling to substrate modes and improve isolation for waveguides 140. For example, floating conductor 110 may be formed onto substrate 105, and substrate 105 and floating conductor 110 may be mounted onto carrier substrate 130 (e.g., using an adhesive as described herein), which may be a second substrate layer of the optical modulator that is a carrier layer for substrate 105. Floating conductor 110 results in an effective thickness of the optical modulator being approximately a thickness of substrate 105, rather than a thickness of substrate 105 and carrier substrate 130. The effective thickness may refer to a thickness of the optical modulator with regard to excitation of dielectric modes and parallel-plate modes. In contrast, a mechanical thickness may refer to a thickness of the optical modulator with regard to mechanical characteristics (e.g., rigidity). In this case, the mechanical thickness may be approximately a thickness of substrate 105 and carrier substrate 130. In this way, the optical modulator can be configured with an effective thickness less than a threshold to suppress parasitic loss, and a mechanical thickness greater than a threshold to ensure a threshold level of mechanical rigidity. In some implementations, multiple substrates 105 may be disposed between a surface of the optical modulator and floating conductor 110. In some implementations, multiple substrates 105 may be associated with different dielectric materials, the same materials, or the like. In some implementations, multiple substrates 105 may be associated with different thicknesses, the same thickness, or the like.

In some implementations, floating conductor 110 may be an electrode for the optical modulator. In some implementations, floating conductor 110 may be grounded or partially grounded. For example, floating conductor 110 may be separated from an RF ground, but may be connected to a ground path for direct current (DC) current or for alternating current (AC) current that is less than a threshold frequency of, for example, 1 megahertz (MHz). In some implementations, floating conductor 110 may be isolated from ground electrodes 115. For example, substrate 105 may lack vias, edge wrap, or RF interconnects to provide a path between ground electrodes 115 and floating conductor 110.

In some implementations, lamination of a substrate of the optical modulator (e.g., assembly of substrate 105, floating conductor 110, carrier substrate 130, or the like) may occur before electrodes (e.g., ground electrodes 115 and signal electrodes 125) are fabricated onto a surface of substrate 105. For example, a wafer may be thinned to approximately 300 micrometers thickness, such as using a back grinding procedure, a seed layer of approximately 1000 Å may be deposited onto substrate 105 or carrier substrate 130, and floating conductor 110 may be plated onto the seed layer. In some implementations, the seed layer may be a gold seed layer. In some implementations, the seed layer may improve conduction of pyroelectric charge. In some implementations, electrodes (e.g., ground electrodes 115 and signal electrodes 125) may be manufactured using an electroplating procedure, a photolithography procedure, or the like. In some implementations, the optical modulator may include a set of grooves cut into the optical modulator (e.g., into substrate 105, carrier substrate 130, or the like).

Ground electrodes 115, signal electrode 125, and waveguides 140 form a Mach-Zehnder (MZ) interferometer to modulate an optical signal. Ground electrodes 115 and signal electrode 125 may be disposed onto a surface of substrate 105, buffer layer 145, bleed layer 150, or the like. Waveguides 140 may be disposed under a surface of substrate 105, buffer layer 145, bleed layer 150, or the like (e.g., a threshold distance from the surface of substrate 105, buffer layer 145, bleed layer 150, or the like). In some implementations, ground electrode slots 120 are included in ground electrodes 115 to reduce a differential mechanical stress of waveguides 140 relative to using non-slotted ground electrodes. In some implementations, substrate slots 135 are included in substrate 105 to improve modulation efficiency for the optical modulator relative to using a non-slotted substrate. In some implementations, waveguides 140 are a set of coplanar optical waveguides.

Buffer layer 145 is included on substrate 105 to improve impedance matching of waveguides 140 to a driver circuit of the optical modulator and to improve velocity matching between RF signals and optical signals of the optical modular.

Bleed layer 150 includes a layer deposited onto buffer layer 145 and/or substrate 105 to provide a discharge path for pyroelectric charge accumulating on surfaces of the optical modulator. For example, bleed layer 150 may provide a discharge path for pyroelectric charge accumulating on a surface of buffer layer 145, substrate 105, or the like. In this case, the pyroelectric charge may accumulate on a surface based on a pyroelectric effect on, for example, substrate 105. In some implementations, bleed layer 150 may be a tantalum silicon nitride (TaSiN) layer. In some implementations, bleed layer 150 may be a metal layer, such as a chromium (Cr) layer, a titanium tungsten (TiW) layer, a gold (Au) layer, or the like. In some implementations, the optical modulator may include multiple bleed layers 150. For example, the optical modulator may include a first bleed layer 150 of tantalum silicon nitride disposed on a top of the optical modulator (i.e., a surface of the optical modulator onto which ground electrodes 115, signal electrodes 125, or the like are disposed) and a second bleed layer of chromium disposed on a bottom of the optical modulator (i.e., a surface of the optical modulator opposite the top, such as a top or bottom surface of carrier substrate 130).

FIG. 1A may show only a portion of the optical modulator. For example, the optical modulator may include additional ground electrodes 115, signal electrodes 125, waveguides 140, or the like than the quantity shown in FIG. 1A.

As shown in FIG. 1B, a set of dimensions for the optical modulator including the floating conductor 110 may be provided. Although some implementations, described herein, are described in terms of a particular set of dimensions, the dimensions are examples and other dimensions may be possible for some implementations, described herein.

Dimension 152 is 9.8 micrometers and represents a width of a signal electrode 125. Dimension 154 is 6.0 micrometers and represents a width of the bottom of the signal electrode, sometimes called a "stem". Dimension 156 is 7.0 micrometers to 12.0 micrometers and represents a distance between a base of the wide portion of the signal electrode 125 and a surface of bleed layer 150, also the height of the stem. Dimension 158 is 50 micrometers and represents a distance between the surface of bleed layer 150 and a top of signal electrode 125.

Dimension 160 is 20 micrometers and represents a width of a ground electrode slot 120. In some implementations, ground electrode slot 120 is associated with a width of between 20 micrometers and 30 micrometers. In some implementations, ground electrode slot 120 is bridged by a set of shorting bars that are spaced by a separation of 200 micrometers to 500 micrometers along the length of the electrode. In some implementations, the set of shorting bars are spaced by approximately 300 micrometers. In some implementations, ground electrode 115 is associated with a total width of between 50 micrometers and 90 micrometers. In some implementations, ground electrode 115 is associated with a total width of approximately 60 micrometers. Dimension 162 is 1.0 micrometer and represents a distance between an edge of a trench formed by substrate slot 135 and an edge of ground electrode 115. Dimension 164 is 9.5 micrometers and represents a width of a ridge surface between a set of substrate slots 135.

Dimension 166 is 9.5 micrometers and represents a width of a ridge surface between a set of substrate slots 135. Dimension 168 is between approximately 10 micrometers and 60 micrometers, and represents a width of a trench formed by substrate slot 135. The substrate slots on either side of the signal electrode may be much smaller than the dimension 180, leaving a larger planar (unslotted) region near the ground electrodes. Dimension 170 is between 1.0 micrometer and 40 micrometers, and represents a distance between an edge of a trench formed by substrate slot 135 and an edge of a ground electrode 115. Dimension 172 is between 3.0 micrometers and 5.0 micrometers and represents a depth of a substrate slot 135. Dimension 174 is between approximately 10.0 micrometers and dimension 158, and represents a height of a ground electrode 115. In some implementations, ground electrode 115 is associated with a height that is greater than or equal to a height of signal electrode 125.

Dimension 176 is 300 micrometers and represents a thickness of substrate 105 and a distance between floating conductor 110 and, for example, ground electrode 115. In some implementations, substrate 105 is between 100 micrometers and 500 micrometers in thickness, between 200 micrometers and 300 micrometers in thickness, or the like. In this way, substrate modes may be shifted to frequencies greater than 50 GHz (e.g., for a 200 micrometer thickness), thereby reducing parasitic RF loss. In some implementations, floating conductor 110 is between 2 micrometers and 10 micrometers in thickness, approximately 6 micrometers in thickness, or the like. In this way, floating conductor 110 is associated with less than a threshold sheet conductivity for RF currents at frequencies greater than 30 GHz.

Dimension 178 is 60.0 micrometers and represents a width of ground electrode 115. In some implementations, ground electrode 115 is associated with a width of between 40 micrometers and 90 micrometers, between 50 micrometers and 90 micrometers, or the like. Dimension 178 may vary along the electrode length to prevent connection with adjacent RF ground electrodes of other RF signal channels. Dimensions 180 are 55.0 micrometers and represents a gap between ground electrodes 115 and signal electrode 125. In some implementations, dimensions 180 are between 20 micrometers and 60 micrometers. Dimension 182 is 0.26 micrometers and represents a thickness of bleed layer 150. In some implementations, carrier substrate 130 may be associated with a thickness of approximately 700 micrometers. In some implementations, carrier substrate 130 may be associated with a thickness of between 100 micrometers and 700 micrometers. In some implementations, an adhesive (e.g., adhesive 205 in FIG. 2) may be between 50 micrometers and 150 micrometers in thickness. In some implementations, the adhesive may be approximately 100 micrometers in thickness.

As indicated above, FIGS. 1A and 1B are provided merely as an example. Other examples are possible and may differ from what was described with regard to FIGS. 1A and 1B.

Figure 2:
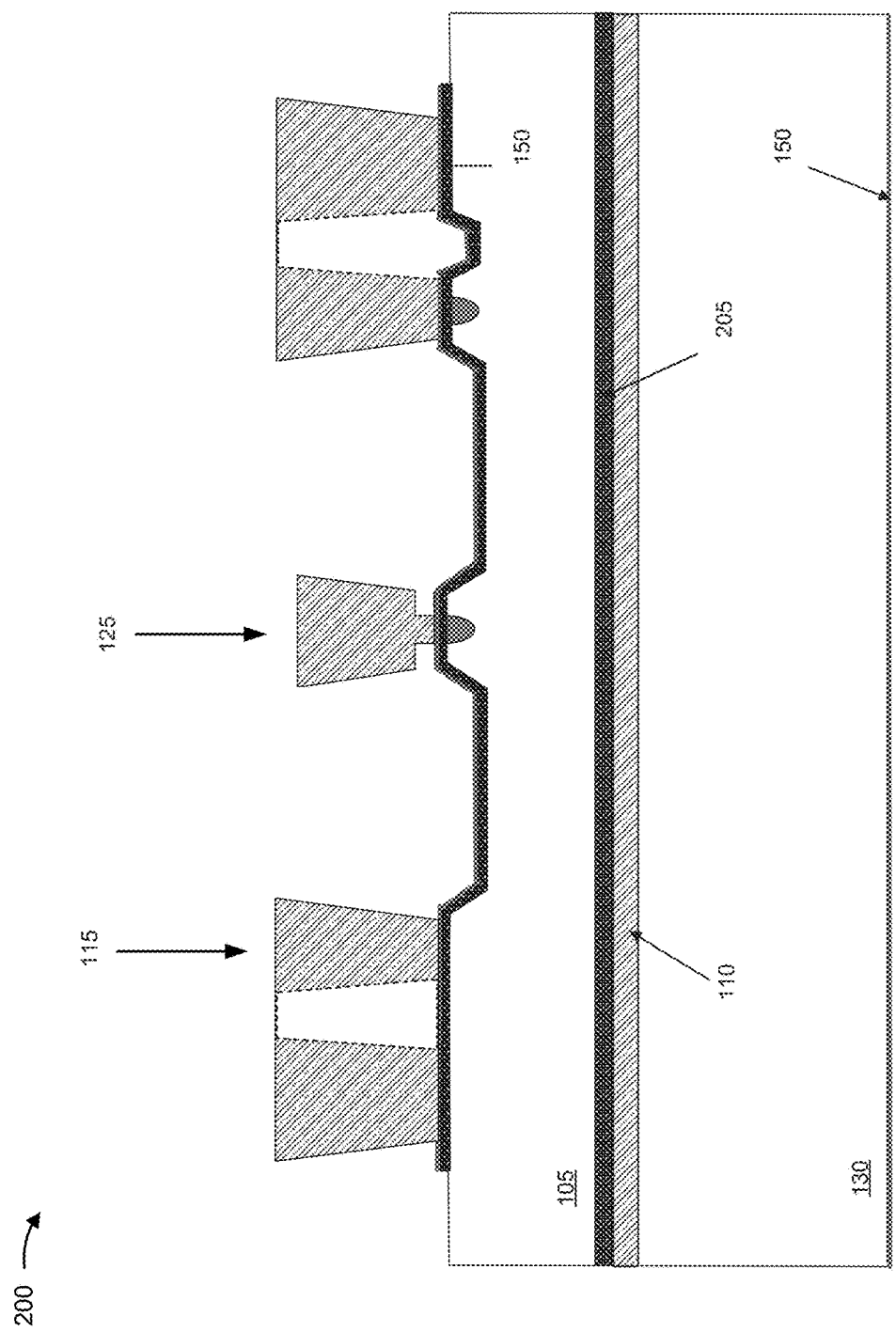
FIG. 2 is a diagram of an example implementation relating to an optical modulator described herein.

FIG. 2 is a diagram of an example implementation 200. FIG. 2 shows an example of a carrier substrate attached to the optical modulator using an adhesive.

With regard to FIG. 2, carrier substrate 130 may be a z-cut lithium niobate carrier substrate that is attached to substrate 105 using adhesive 205. In some implementations, adhesive 205 and/or floating conductor 110 may reduce pyroelectric charge generated at a surface of substrate 105 (e.g., a bottom surface of substrate 105 onto which adhesive 205 and/or floating conductor 110 is disposed). In some implementations, adhesive 205 is conductive at DC frequencies to allow discharge of pyroelectric created charge, for example adhesive with carbon or graphite in it. In other implementations, adhesive 205 is conductive at DC frequencies and RF frequencies, for example, in the case for silver epoxy. Based on laminating substrate 105 prior to electrode fabrication (e.g., fabrication of ground electrodes 115 and/or signal electrodes 125), a manufacturing difficulty may be reduced relative to using a thinned wafer for electrode fabrication or thinning a wafer onto which electrodes are already fabricated. In some implementations, including bleed layer 150 at a bottom surface of carrier substrate 130 may reduce a pyroelectric charge associated with carrier substrate 130. In some implementations, such as when carrier substrate 130 is an aluminum based substrate or another non-pyroelectric material, bleed layer 150 may be included at a bottom surface of carrier substrate 130 to reduce a pyroelectric charge resulting from a pyroelectric dipole field from substrate 105.

As indicated above, FIG. 2 is provided merely as an example. Other examples are possible and may differ from what was described with regard to FIG. 2.

Figure 3:
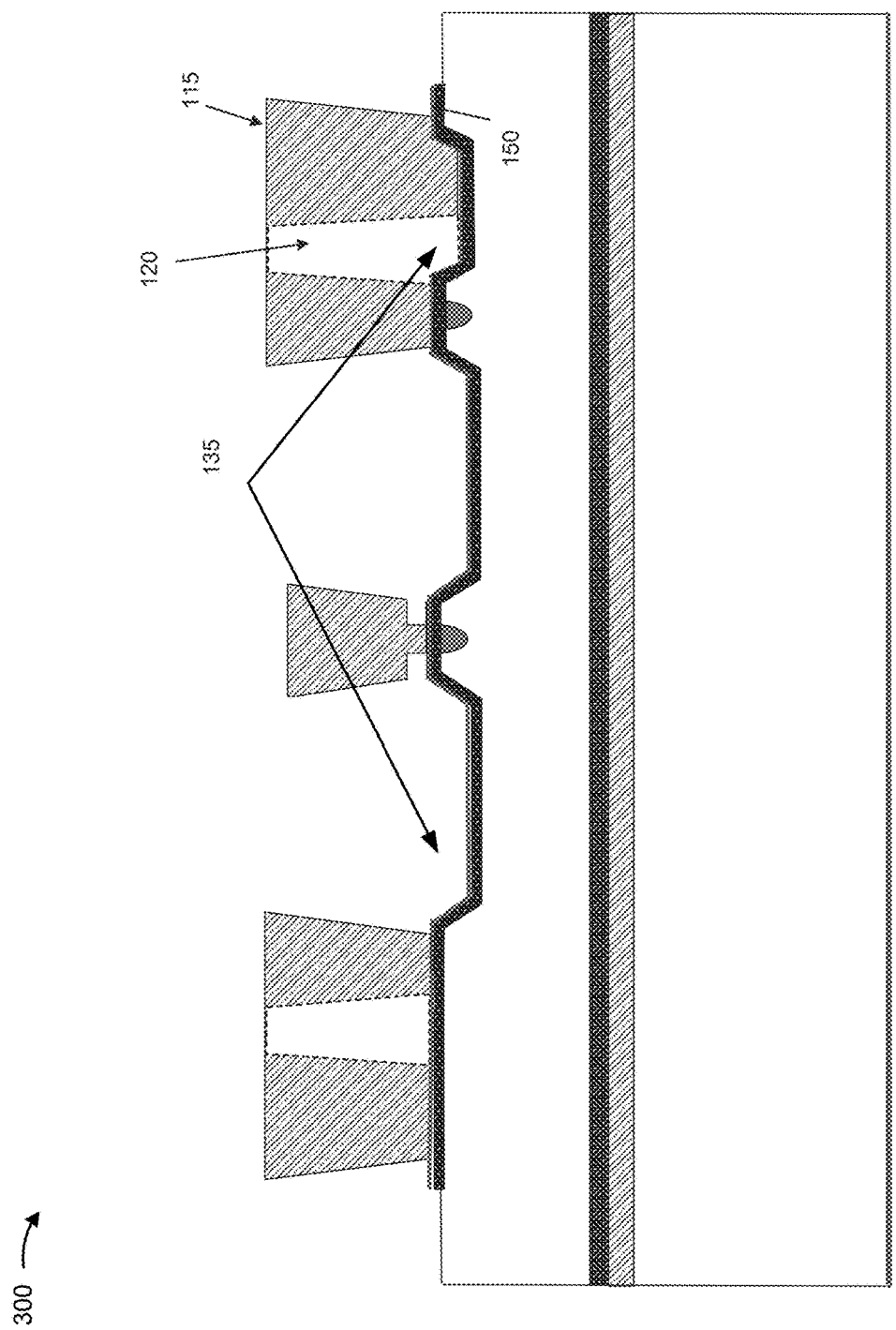
FIG. 3 is a diagram of an example implementation relating to an optical modulator described herein.

FIG. 3 is a diagram of an example implementation 300. FIG. 3 shows an example of an optical modulator with another configuration for a substrate slot 135.

As shown in FIG. 3, substrate slots 135 may be configured to be a common width for the optical modulator, thereby improving mechanical symmetry of the optical modulator. For example, a particular substrate slot 135 may extend under ground electrode 115 to enable an increased width for the particular substrate slot 135 relative to other configurations where the particular substrate slot is located between portions of ground electrode 115. In this way, the optical modulator may be associated with reduced differential thermal induced stress, which may reduce a change to a bias voltage applied to the Mach-Zehnder interferometer to tune the Mach-Zehnder interferometer to a selected operating point (e.g., a minimum transmission point) relative to the optical modulator of FIG. 2.

As indicated above, FIG. 3 is provided merely as an example. Other examples are possible and may differ from what was described with regard to FIG. 3.

Figure 4:
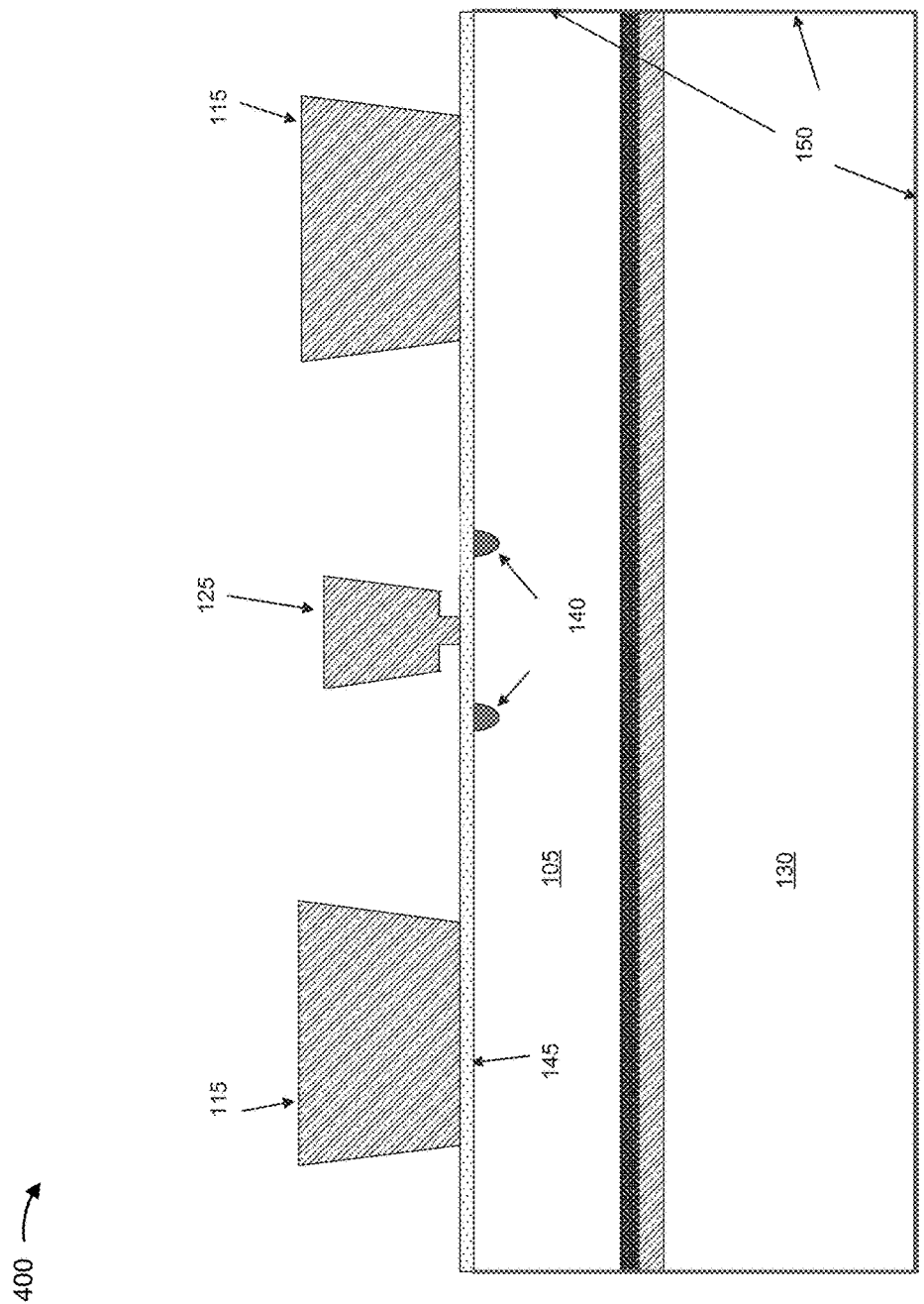
FIGS. 4-12 are diagrams of example implementations relating to floating conductor configurations for an optical modulator described herein.

FIG. 4 is a diagram of an example implementation 400. FIG. 4 shows an example of an optical modulator with another configuration for substrate 105.

As shown in FIG. 4, substrate 105 is an x-cut lithium niobate substrate. In some implementations, bleed layer 150 may be positioned at a bottom surface of carrier substrate 130 and at sides (e.g., z-faces) of the optical modulator. In some implementations, signal electrode 125 is positioned between waveguides 140. In this case, waveguides 140 are each positioned between signal electrode 125 and one of the ground electrodes 115, rather than being positioned such that a first waveguide 140 is underneath signal electrode 125 and a second waveguide 140 is underneath a ground electrode 115 as in FIG. 2.

As shown, the optical modulator may lack substrate slots 135 or ground electrode slots 120. In some implementations, carrier substrate 130 may be x-cut lithium niobate. In this way, modulation strength balance between waveguides 140 may be improved relative to another optical modulator. In some implementations, carrier substrate 130 may include an aluminum based material. In some implementations, carrier substrate 130 may include a metal based material, such as steel or the like. In some implementations, substrate 105 may be between 5 micrometers and 20 micrometers in thickness, which may improve modulation efficiency relative to a thicker substrate.

As indicated above, FIG. 4 is provided merely as an example. Other examples are possible and may differ from what was described with regard to FIG. 4.

Figure 5:
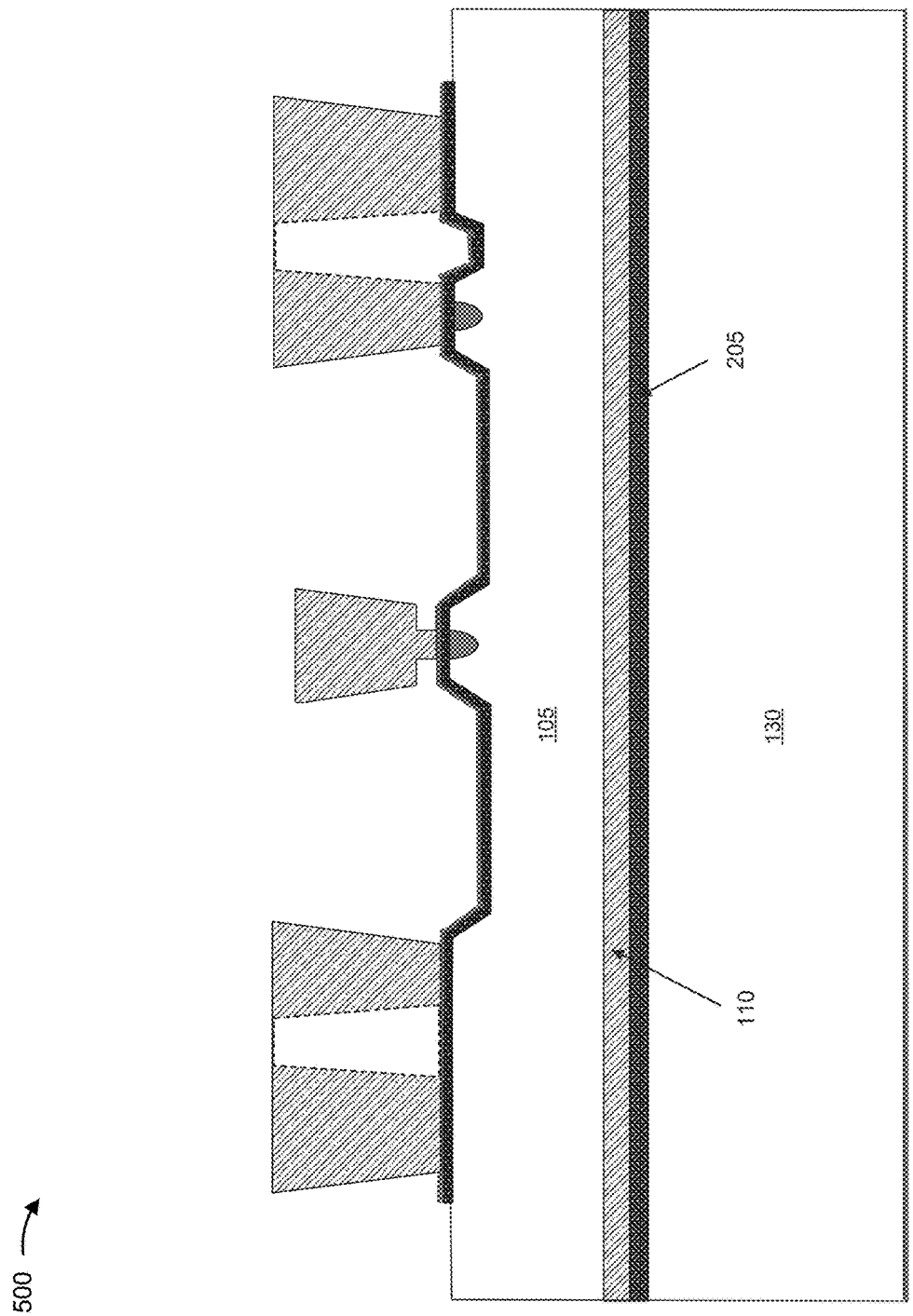

FIG. 5 is a diagram of an example implementation 500. FIG. 5 shows an example of another configuration of floating conductor 110.

As shown in FIG. 5, floating conductor 110 may be formed on a bottom surface of substrate 105 rather than on a top surface of carrier substrate 130. In this case, adhesive 205 is disposed onto floating conductor 110 to enable carrier substrate 130 to be bonded to floating conductor 110 and substrate 105. In this way, adhesive 205 is not an electrical part of substrate 105 as a result of adhesive 205 being between floating conductor 110 and carrier substrate 130 rather than between floating conductor 110 and substrate 105. In this way, the optical modulator is associated with a reduced effective thickness relative to adhesive 205 disposed between floating conductor 110 and substrate 105. The reduced effective thickness causes RF substrate modes to be shifted to higher frequencies, thereby improving optical modulator performance. Moreover, based on adhesive 205 not being an electrical part of substrate 105, a variability in a thickness of adhesive 205 does not cause an alteration in RF substrate modes, thereby improving optical modulator performance. In some implementations, adhesive 205 may be a conductive adhesive layer, a non-conductive adhesive layer, or the like. For example, when floating conductor 110 or bleed layer 150 provide a discharge path for a threshold amount of pyroelectric charge, non-conductive adhesive may be used for adhesive 205. In some implementations, adhesive 205 may include a first portion of conductive adhesive and a second portion of non-conductive adhesive to provide a discharge path for a threshold amount of pyroelectric charge. In some implementations, a conductive adhesive using graphite particles or silver particles dispersed within epoxy may be used for adhesive 205. In some implementations, adhesive 205 may be an epoxy layer or another type of adhesive.

As indicated above, FIG. 5 is provided merely as an example. Other examples are possible and may differ from what was described with regard to FIG. 5.

Figure 6:
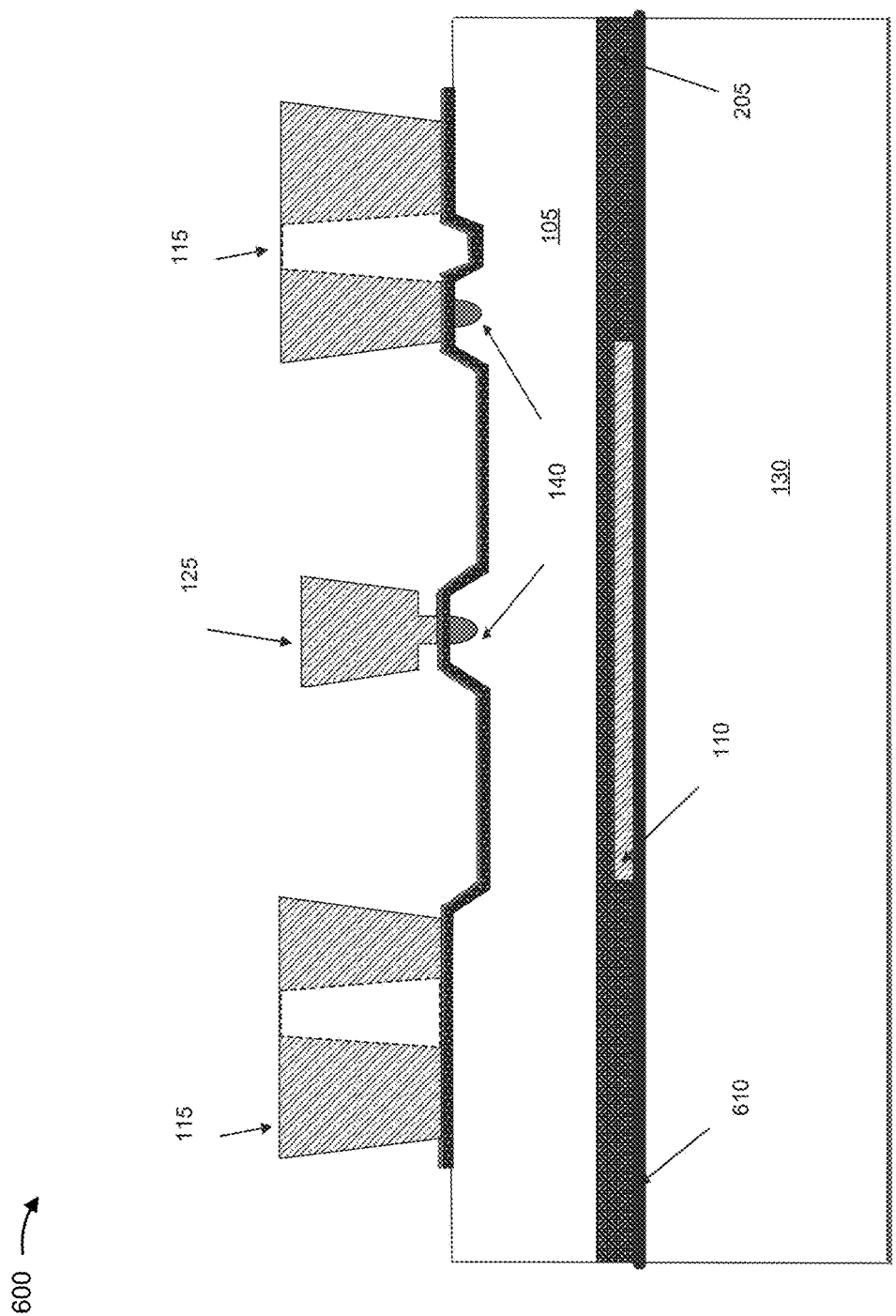

FIG. 6 is a diagram of an example implementation 600. FIG. 6 shows an example of another configuration of floating conductor 110.

As shown in FIG. 6, floating conductor 110 may be patterned onto carrier substrate 130 or onto an electrode 610 patterned onto carrier substrate 130. In this case, floating conductor 110 associated with a narrowed width, such that floating conductor 110 is disposed beneath waveguides 140 and is disposed between ground electrodes 115. In this way, floating conductor 110 may suppress substrate modes and improve isolation between modulation produced by adjacent RF signal channels (sometimes called electrical crosstalk from direct RF coupling between RF channels) or electro-optic crosstalk (due to modulation in waveguides 140 from adjacent RF signal channels). In some implementations, floating conductor 110 is aligned such that floating conductor 110 does not extend an entire width of substrate 105. For example, floating conductor 110 may be disposed such that floating conductor 110 is approximately between ground electrodes 115. In some implementations, floating conductor 110 and electrode 610 are patterned onto carrier substrate 130, and substrate 105 is adhered onto floating conductor 110 and/or electrode 610 using adhesive 205. In this way, a quantity of lithographic steps is reduced relative to patterning floating conductor 110 and electrode 610 directly onto substrate 105.

Electrode 610 may be included in the optical modulator, in some implementations, to improve DC conduction of pyroelectric charge from substrate 105, such as when substrate 105 is a material that exhibits the pyroelectric effect (e.g., lithium niobate). In this case, electrode 610 may be disposed to cover an entire bottom surface of substrate 105, such as based on being adhered to substrate 105 using adhesive 205 and may be disposed to cover an entire top surface of carrier substrate 130. In some implementations, electrode 610 may be associated with a thickness of between 500 angstroms (Å) and 1500 Å, between 750 Å and 1250 Å, or the like. In some implementations, electrode 610 is associated with a thickness of approximately 1000 A. In this way, electrode 610 causes a threshold level of RF loss to RF currents formed in electrode 610 and maintains a threshold thickness for conduction of pyroelectric charge from substrate 105. In some implementations, electrode 610 and adhesive 205 may collectively provide conduction to remove pyroelectric charge from substrate 105, such as based on adhesive 205 having a threshold conductivity.

As indicated above, FIG. 6 is provided merely as an example. Other examples are possible and may differ from what was described with regard to FIG. 6.

Figure 7:
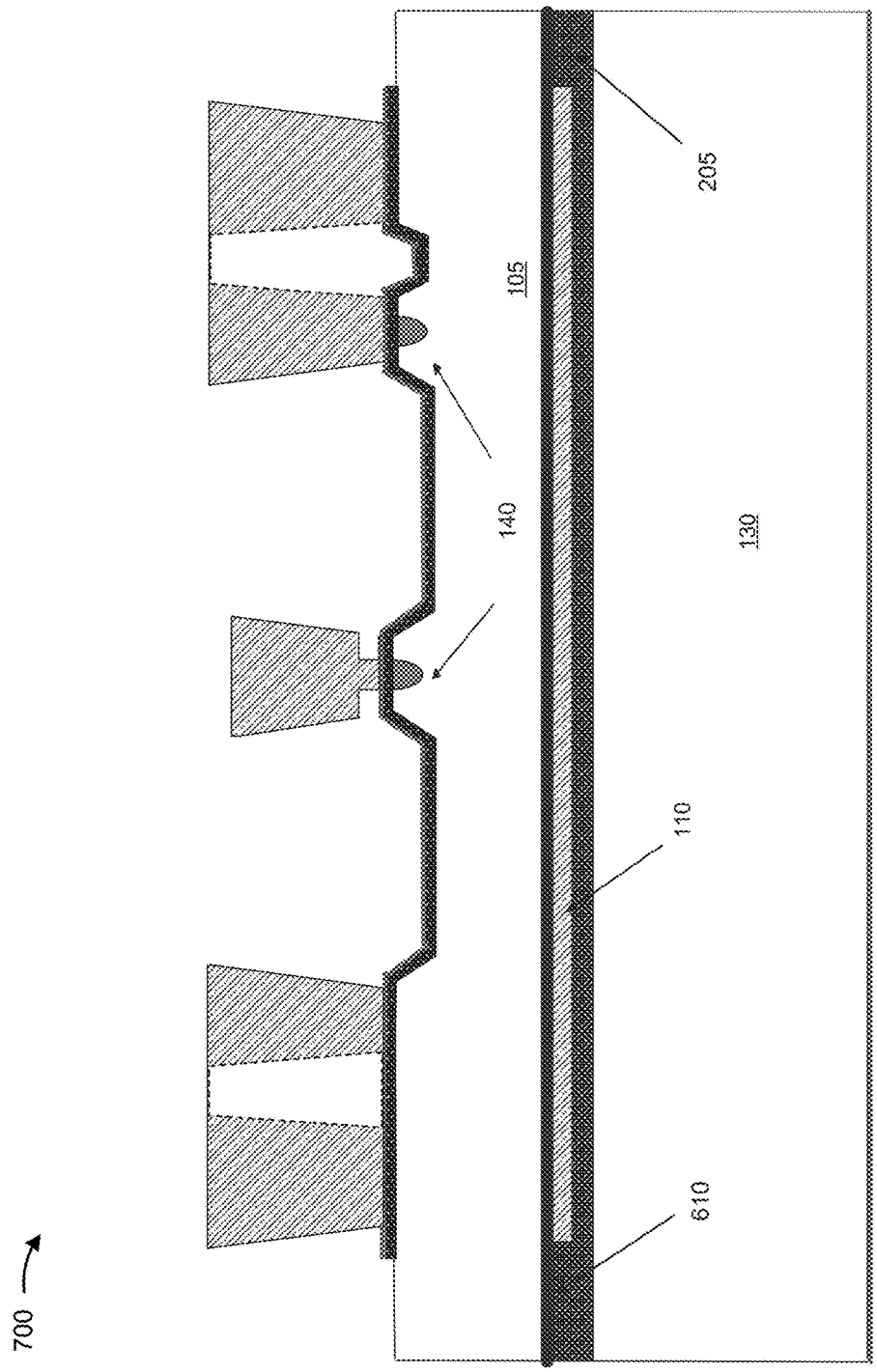

FIG. 7 is a diagram of an example implementation 700. FIG. 7 shows another configuration of floating conductor 110.

As shown in FIG. 7, floating conductor 110 and electrode 610 are formed directly on substrate 105 rather than onto carrier substrate 130. In this case, adhesive 205 is disposed onto floating conductor 110 and electrode 610 to attach carrier substrate 130 to substrate 105. In this way, a difficulty in manufacture may be reduced by enabling either conductive or non-conductive adhesives to be selected for adhesive 205. Moreover, adhesive 205 is positioned between floating conductor 110 and carrier substrate 130, thereby reducing the effective thickness of substrate 105, which suppresses RF modes of waveguides 140.

As indicated above, FIG. 7 is provided merely as an example. Other examples are possible and may differ from what was described with regard to FIG. 7.

Figure 8:
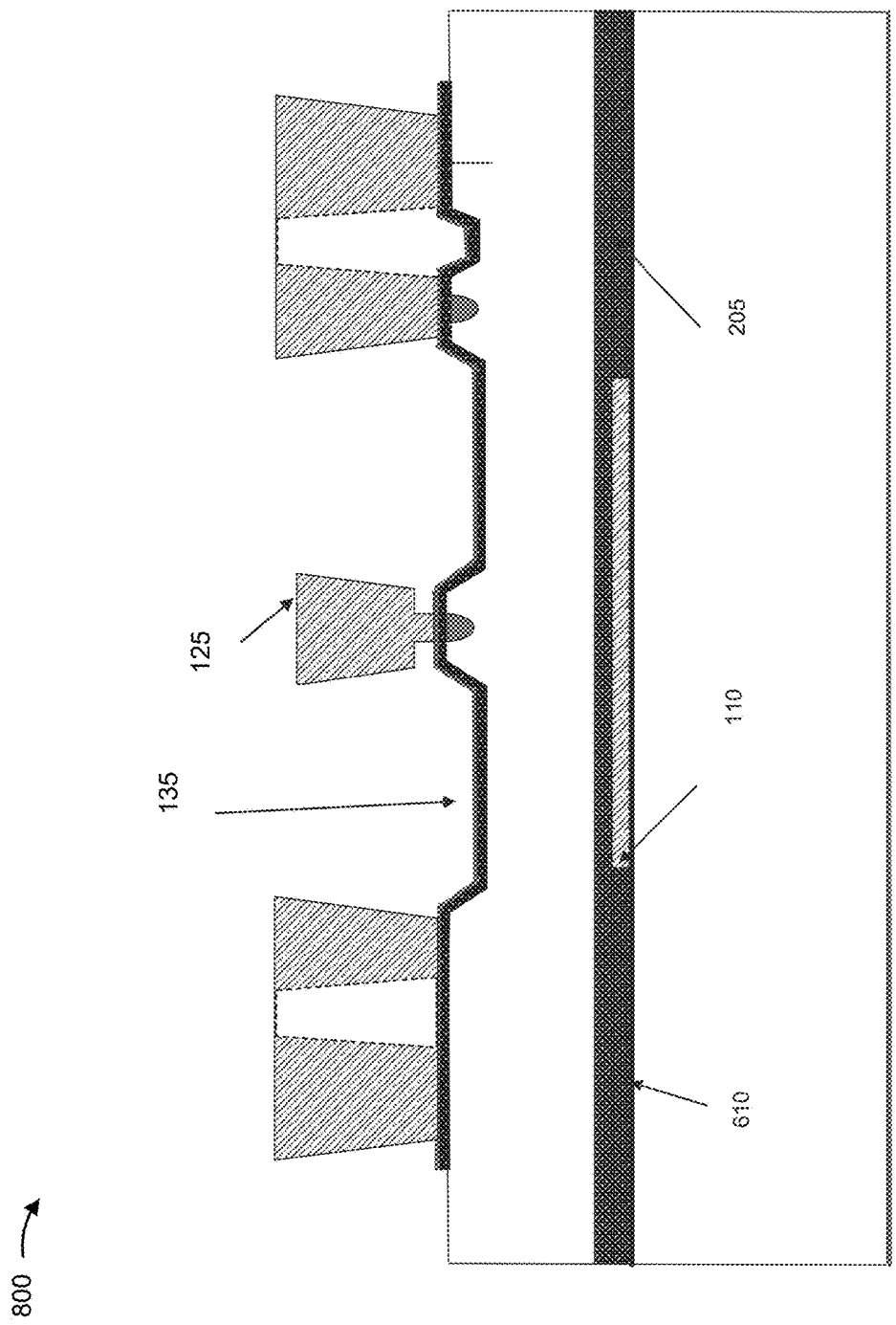
Figure 9:
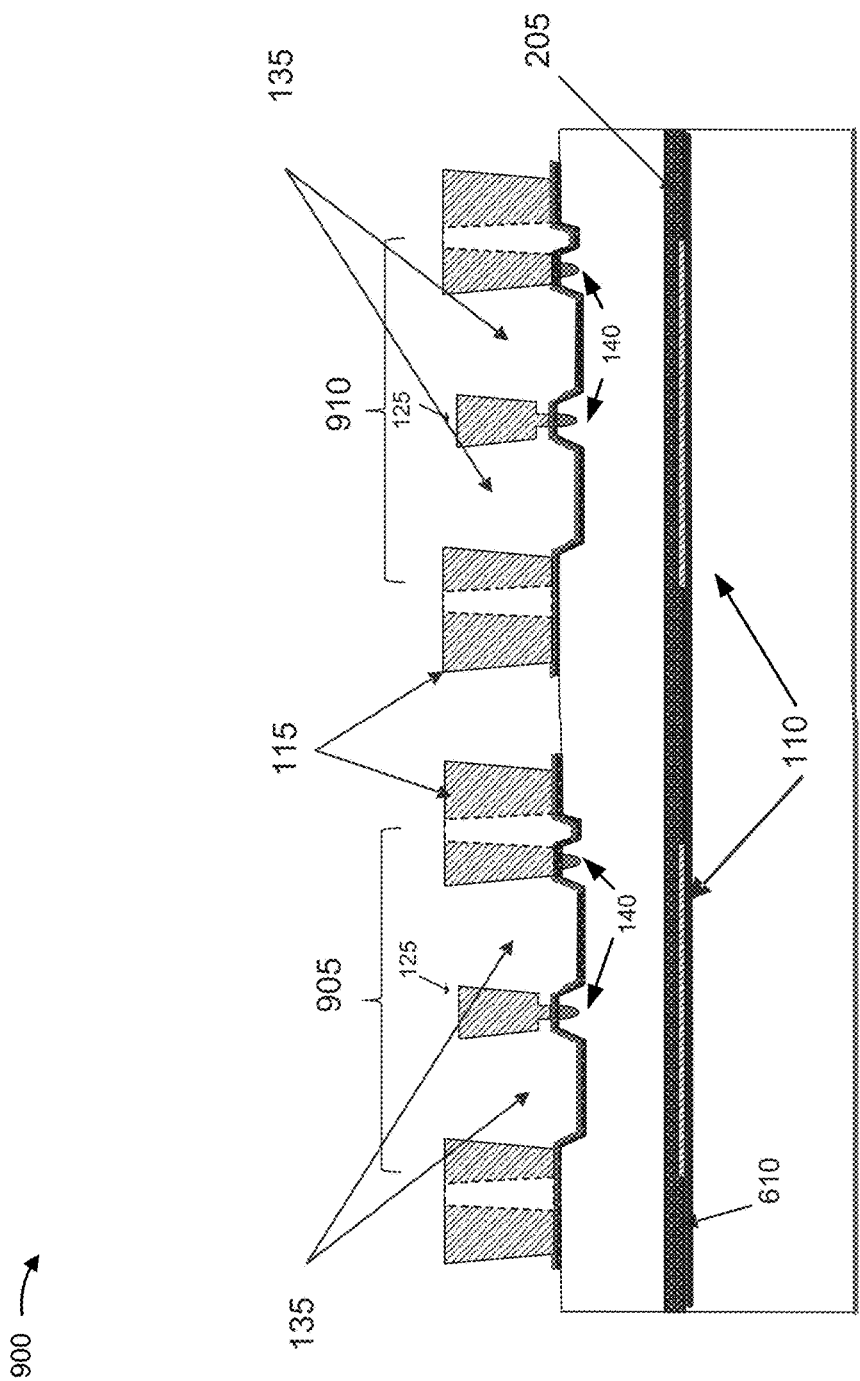
Figure 10:
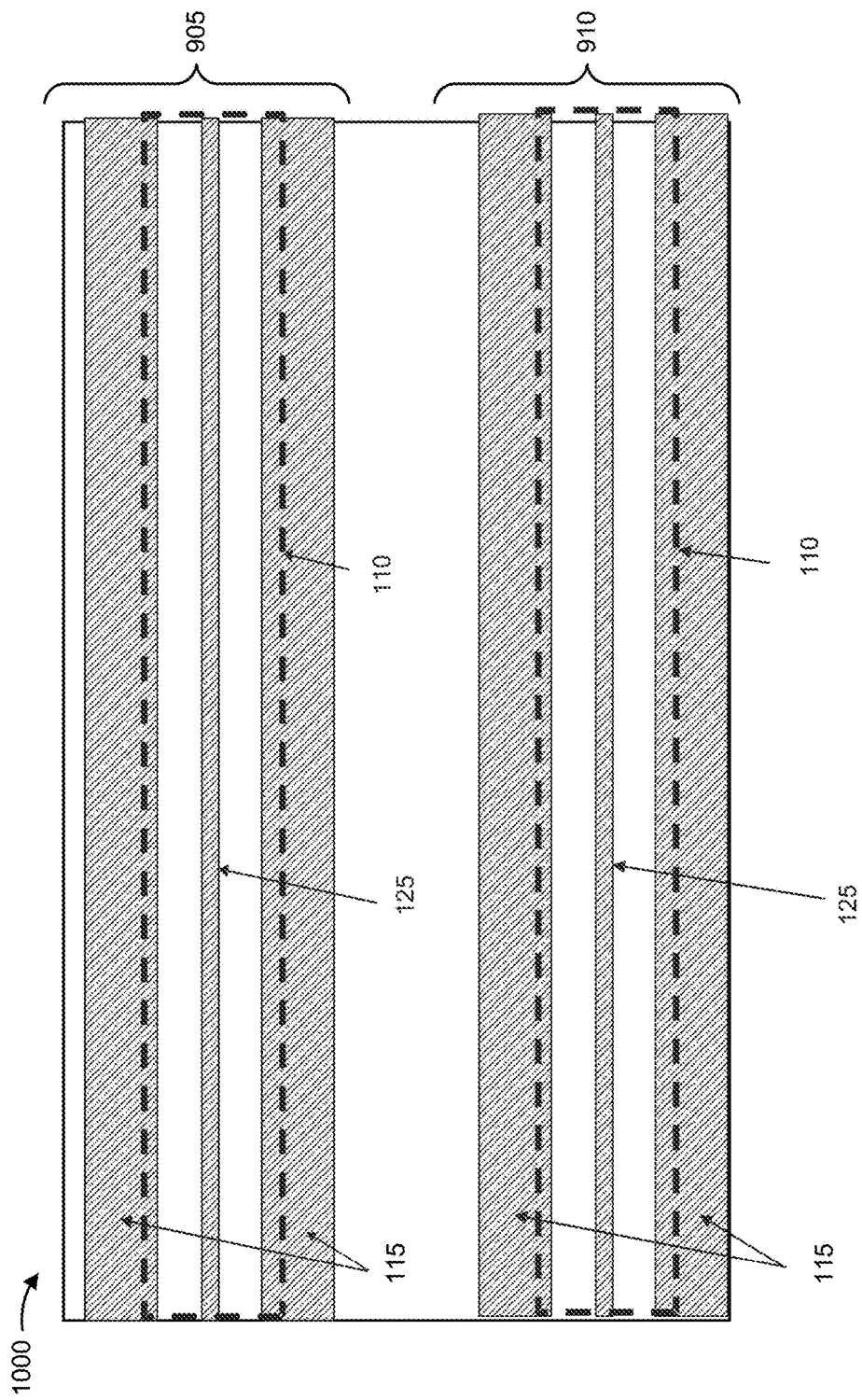

FIGS. 8-10 are diagrams of example implementations 800-1000. FIGS. 8-10 show an example of another configuration of floating conductor 110.

As shown in FIG. 8, a width of floating conductor 110 is reduced relative to other configurations of floating conductor 110, such that floating conductor 110 is disposed underneath substrate slots 135 and signal electrode 125.

As shown in FIG. 9, the optical modulator may have multiple sets of floating conductors 110, ground electrodes 115, signal electrodes 125, waveguides 140, or the like. As shown by reference number 905, a first section of the optical modulator includes a signal electrode 125 disposed between a set of ground electrodes 115 and disposed between a set of substrate slots 135. As shown by reference number 910, a second section of the optical modulator includes another signal electrode 125 disposed between another set of ground electrodes 115 and disposed between another set of substrate slots 135. In this case, each section of the optical modulator may include a floating conductor 110 that is disposed beneath a corresponding set of substrate slots 135 and a corresponding signal electrode 125. In another example, the optical modulator may include 4 sets of waveguides 140, 8 sets of waveguides 140, or the like. The RF electrical isolation between floating conductors 110 improve isolation between RF signals traveling in signal electrodes 125.

As shown in FIG. 10, in a top-down view of the first section of the optical modulator and the second section of the optical modulator, floating conductor 110 is disposed under a set of substrate slots 135 and a signal electrode 125.

As indicated above, FIGS. 8-10 are provided merely as examples. Other examples are possible and may differ from what was described with regard to FIGS. 8-10.

Figure 11:
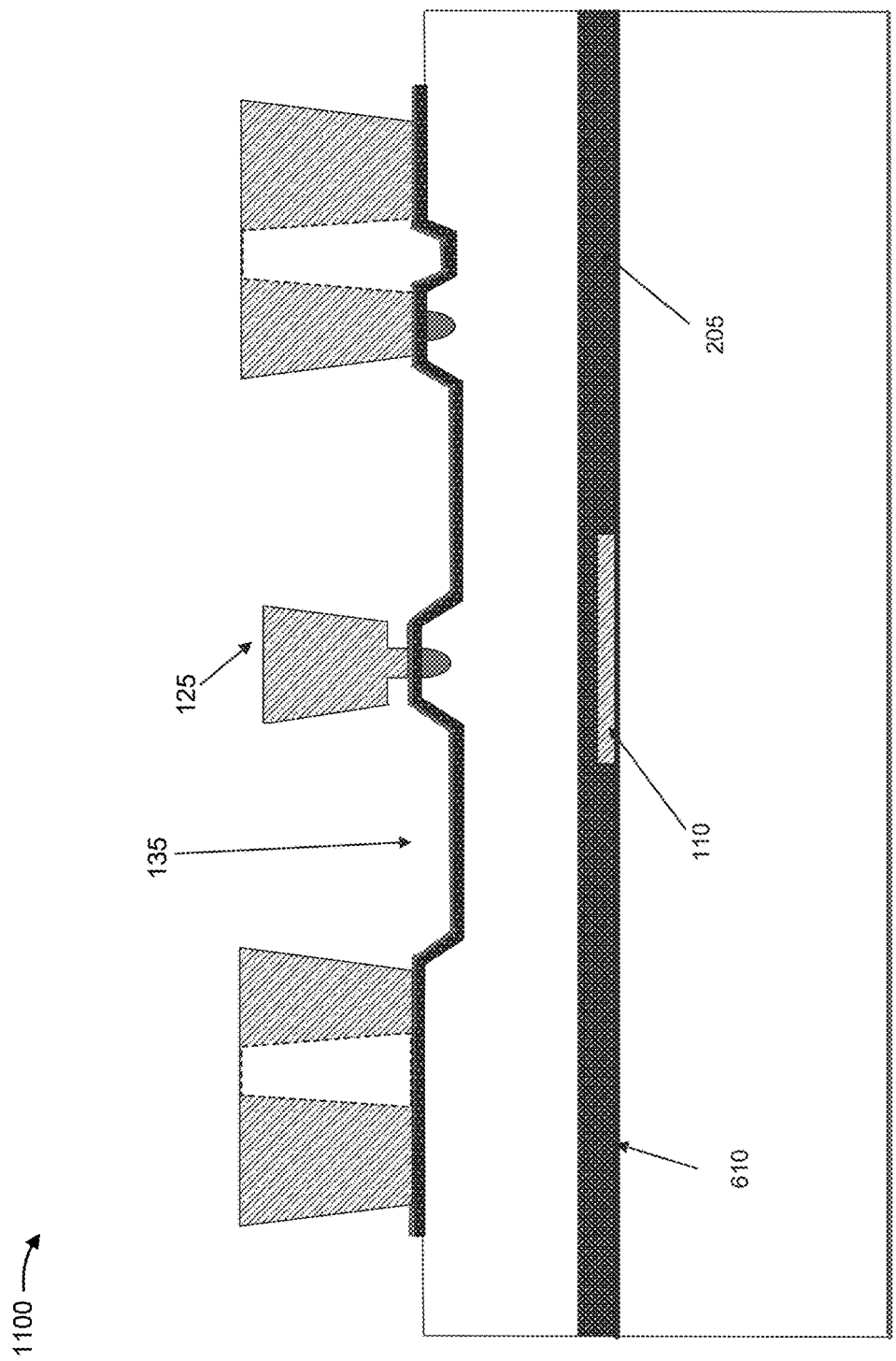

FIG. 11 is a diagram of an example implementation 1100. FIG. 11 shows another configuration of floating conductor 110.

As shown in FIG. 11, floating conductor 110 may be associated with a reduced width relative to other configurations, such that floating conductor 110 is approximately disposed under signal electrode 125 rather than under signal electrode 125 and substrate slots 135. For example, in some implementations, floating conductor 110 may cover all of a surface of substrate 105, carrier substrate 130, the optical modulator, or the like (e.g., a completely laminated substrate). Alternatively, floating conductor 110 may cover all of a majority of substrate 105, carrier substrate 130, the optical modulator, or the like (e.g., a partially laminated substrate). Alternatively, floating conductor 110 may cover less than the majority of the surface of substrate 105, carrier substrate 130, the optical modulator, or the like (e.g., a partially laminated substrate).

As indicated above, FIG. 11 is provided merely as an example. Other examples are possible and may differ from what was described with regard to FIG. 11.

Figure 12:
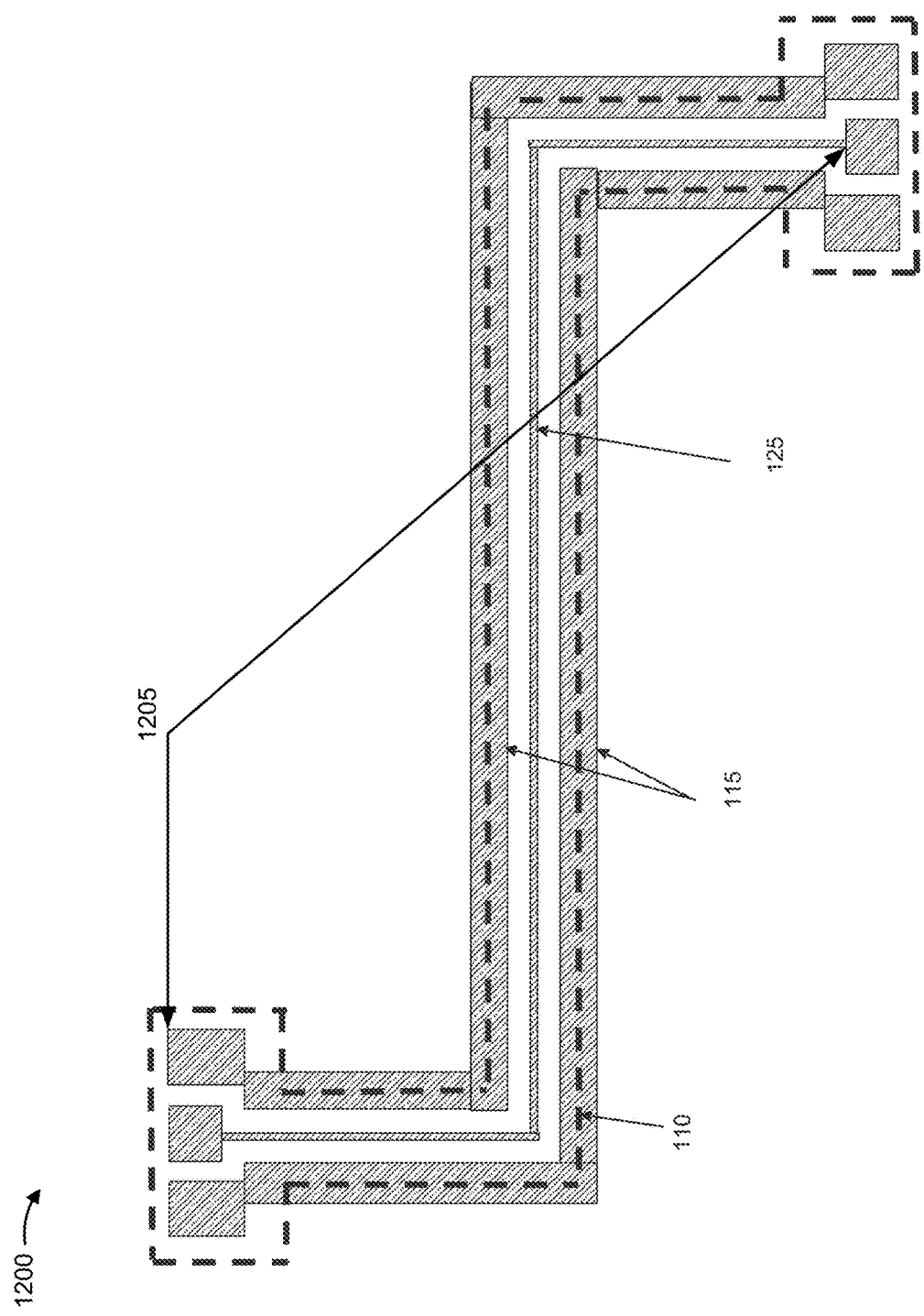

FIG. 12 is a diagram of an example implementation 1200. FIG. 12 shows another configuration of floating conductor 110.

As shown in FIG. 12, in a top-down view, floating conductor 110 is disposed underneath signal electrode 125, and extends into a region of a set of bond pads 1205 for the optical modulator. In this way, floating conductor 110 reduces RF substrate modes in the region of the set of bond pads 1205, thereby improving performance of the optical modulator relative to other configurations.

As indicated above, FIG. 12 is provided merely as an example. Other examples are possible and may differ from what was described with regard to FIG. 12.

Figure 13:
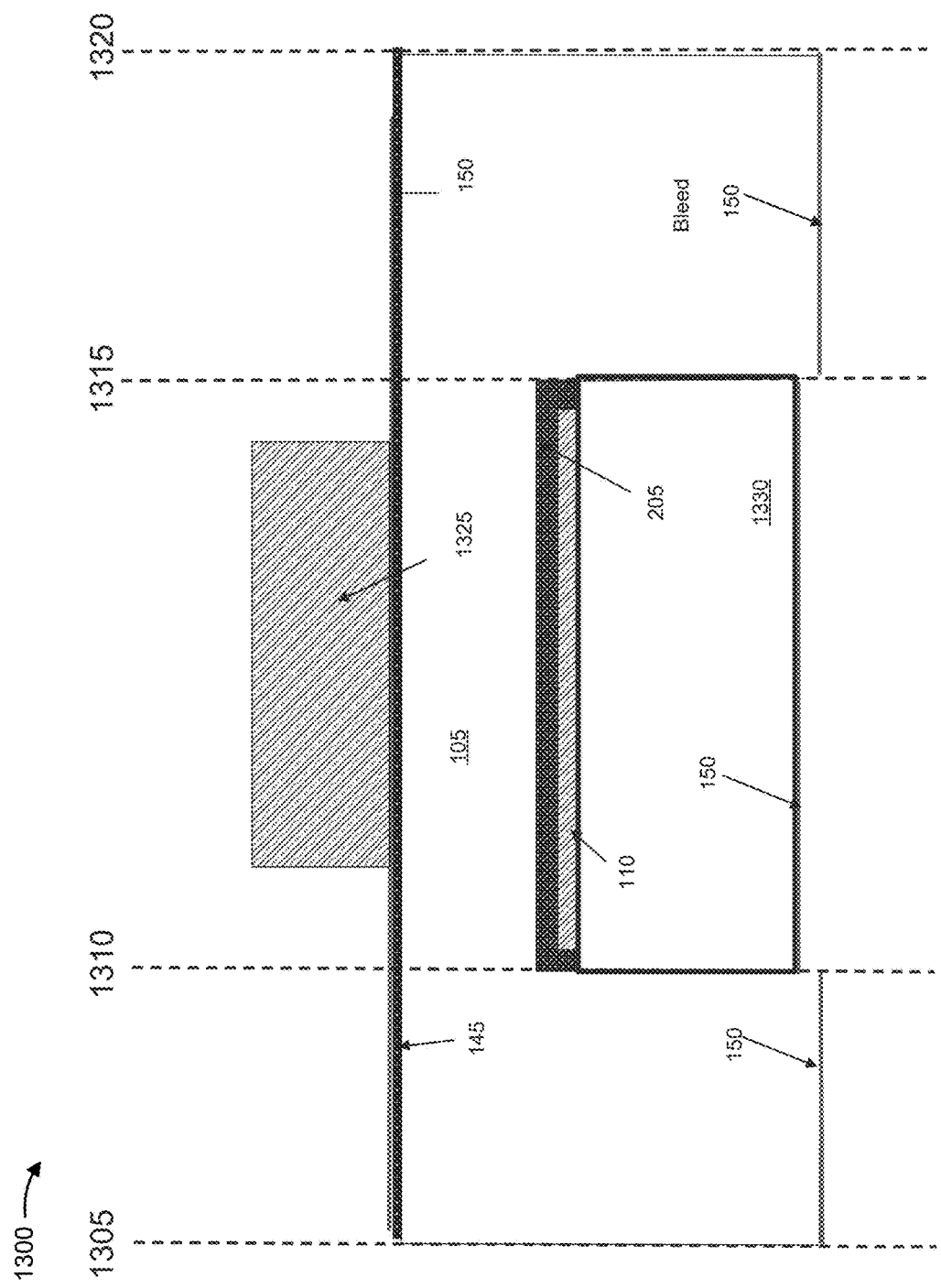
FIGS. 13-16 are diagrams of example implementations relating to partially laminated substrate configurations for an optical modulator described herein.
Figure 14:
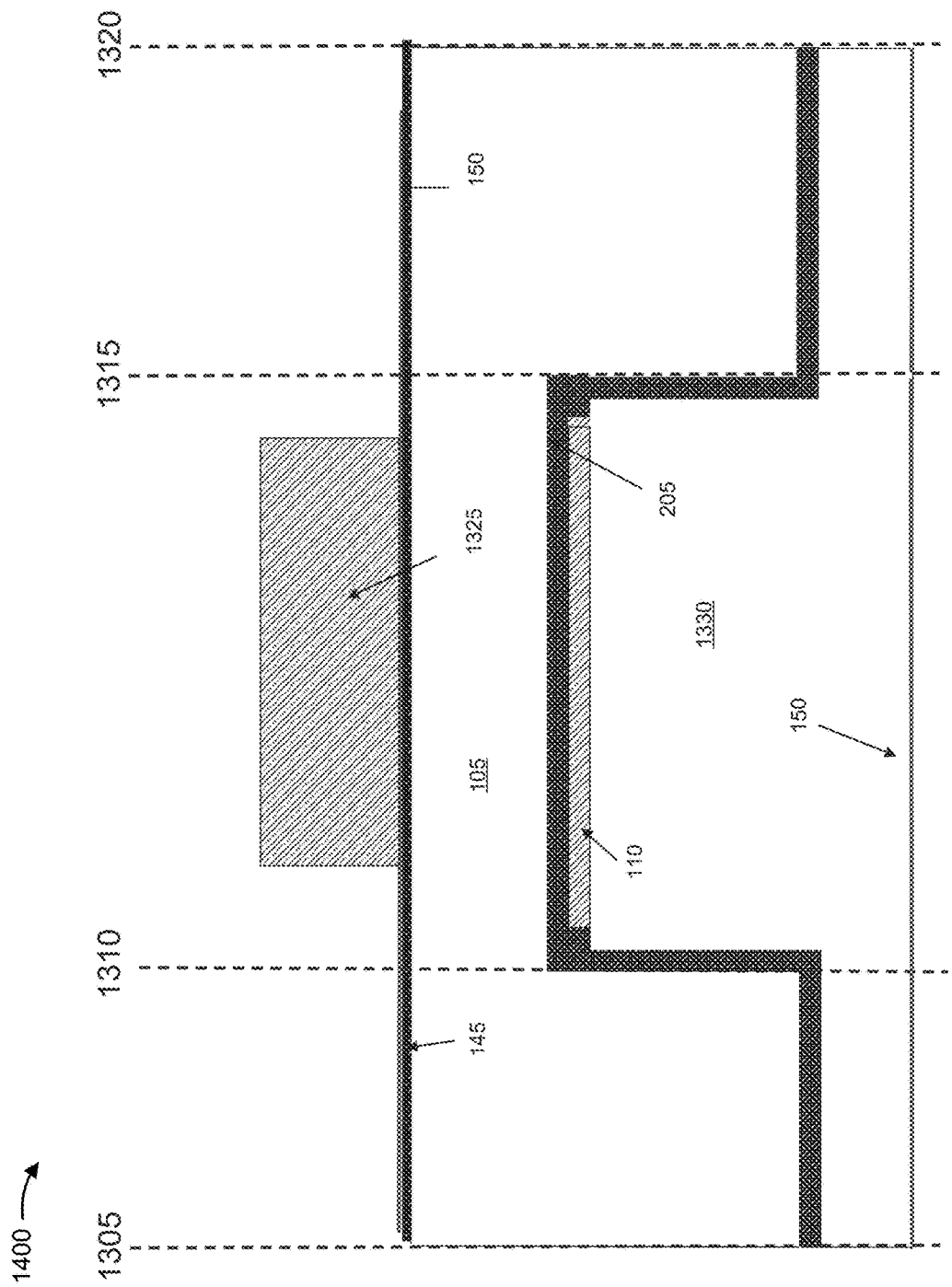

FIGS. 13 and 14 are diagrams of example implementations 1300-1400. FIGS. 13 and 14 show examples of an optical modulator with a partially laminated substrate.

As shown in FIG. 13, the optical modulator includes an electrode assembly 1325 disposed onto substrate 105. Electrode assembly 1325 may include one or more ground electrodes 115, one or more signal electrodes 125, or the like. In this case, the optical modulator is divided into three regions. In a first region, bounded by reference indicators 1305 and 1310, substrate 105 is a non-laminated region. For example, substrate 105 is associated with greater than a threshold thickness (e.g., a threshold associated with ensuring mechanical rigidity and mechanical durability). In a second region, bounded by reference indicators 1310 and 1315, substrate 105 is a laminated region. For example, substrate 105 is associated with less than the threshold thickness in the second region, and an adhesive 205, floating conductor 110, and an inserted substrate 1330 are attached to substrate 105 in the second region. In this case, a portion of substrate 105 may be removed such that substrate 105 is less than the threshold thickness to ensure suppression of parasitic losses, and an inserted substrate 1330 may be attached as a carrier substrate for substrate 105 in the second region. Based on including floating conductor 110 in the second region, which includes electrode assembly 1325, an effective thickness of the optical modulator for suppressing parasitic losses is approximately a thickness of substrate 105 in the second region. In a third region, bounded by reference indicators 1315 and 1320, substrate 105 is a non-laminated. For example, substrate 105 is associated with greater than the threshold thickness.

In this way, the optical modulator may be configured with an effective thickness of less than a threshold associated with ensuring suppression of parasitic losses and a mechanical thickness of greater than a threshold associated with ensuring mechanical rigidity. Moreover, based on partially laminating the optical modulator by limiting the laminated region to the second region of the optical modulator that includes electrode assembly 1325, the optical modulator may be associated with improved manufacturability and durability relative to laminating all of an optical modulator.

The second region, bounded by reference indicators 1310 and 1315, may be fabricated using a narrow blade saw, in some implementations.

In some implementations, the bottom surface of substrate 105, and some portion of the top surface of the inserted substrate 1330 may have gold metallization, and may be bonded together using thermo-compression bonding rather than an adhesive. In some implementations, other metals might be used in place of gold on either or both substrates 105 or 1330, such as nickel, chromium, titanium, or the like.

In some implementations, aluminum may be selected for inserted substrate 1330. Additionally, or alternatively, another material that is thermally matched to a lithium niobate material selected for substrate 105 can be used for inserted substrate 1330. In some implementations, inserted substrate 1330 may be manufactured from a diced portion of a carrier wafer. For example, a carrier wafer may be diced to a selected size and shape, and floating conductor 110 may be fabricated onto the diced portion of the carrier wafer. In this case, inserted substrate 1330 may be inserted into an opening of substrate 105 that is sized and shaped to receive inserted substrate 1330.

As shown in FIG. 14, in another configuration of the optical module, inserted substrate 1330 attaches to substrate 105 to increase a thickness of the optical modulator in each of the first region, the second region, and the third region. For example, adhesive 205 may be disposed onto substrate 105 in each of the first region, the second region, and the third region, to attach inserted substrate 1330 to substrate 105. In this case, floating conductor 110 is sized to be bounded in the second region between inserted substrate 1330 and substrate 105, such that an effective thickness of the optical module for suppressing parasitic losses of electrode assembly 1325 is less than a threshold thickness. In this way, by extending inserted substrate 1330 into the first region and the second region, mechanical rigidity of the optical modulator may be improved relative to inserted substrate being inserted into substrate 105 in the second region only.

As indicated above, FIGS. 13 and 14 are provided merely as examples. Other examples are possible and may differ from what was described with regard to FIGS. 13 and 14.

Figure 15:
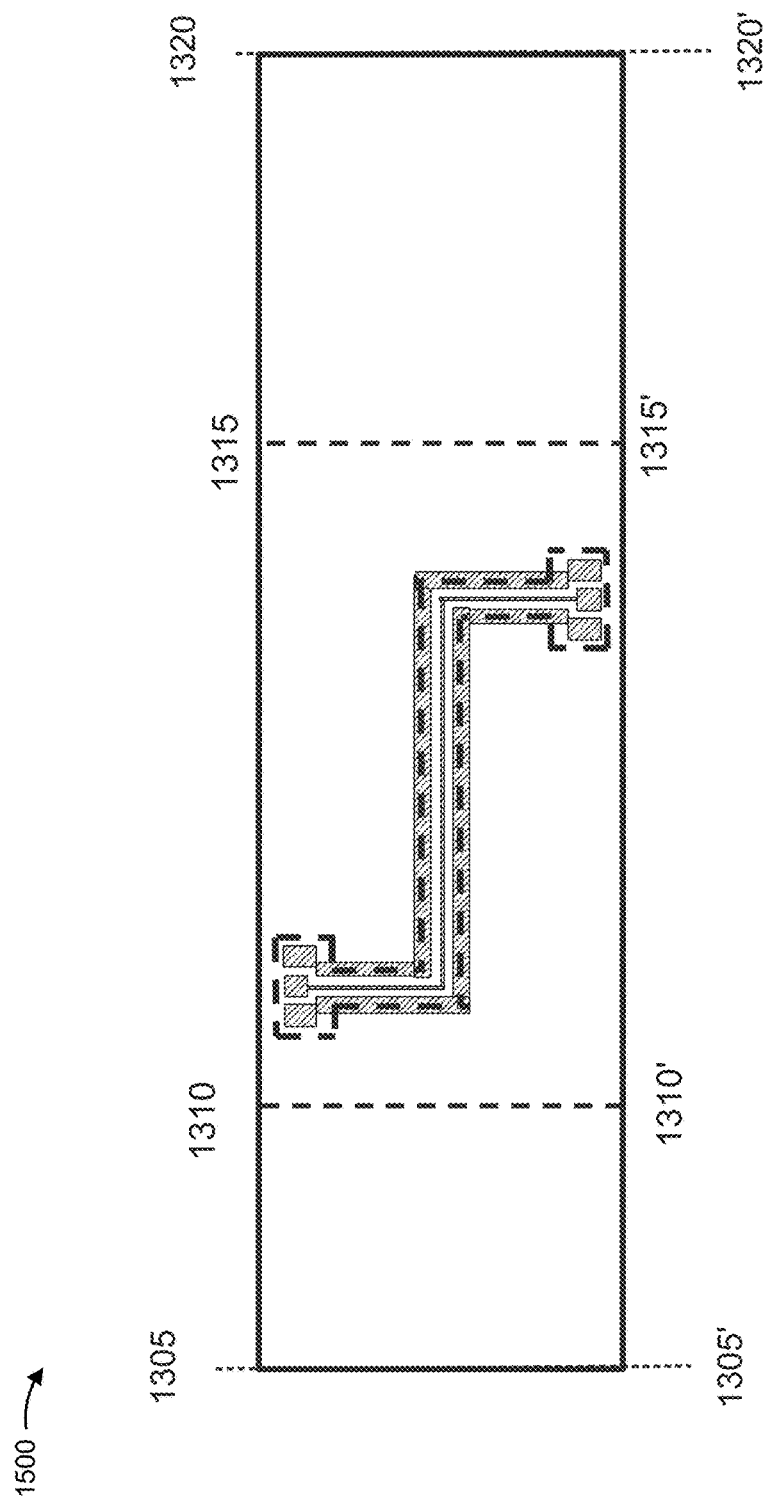
Figure 16:
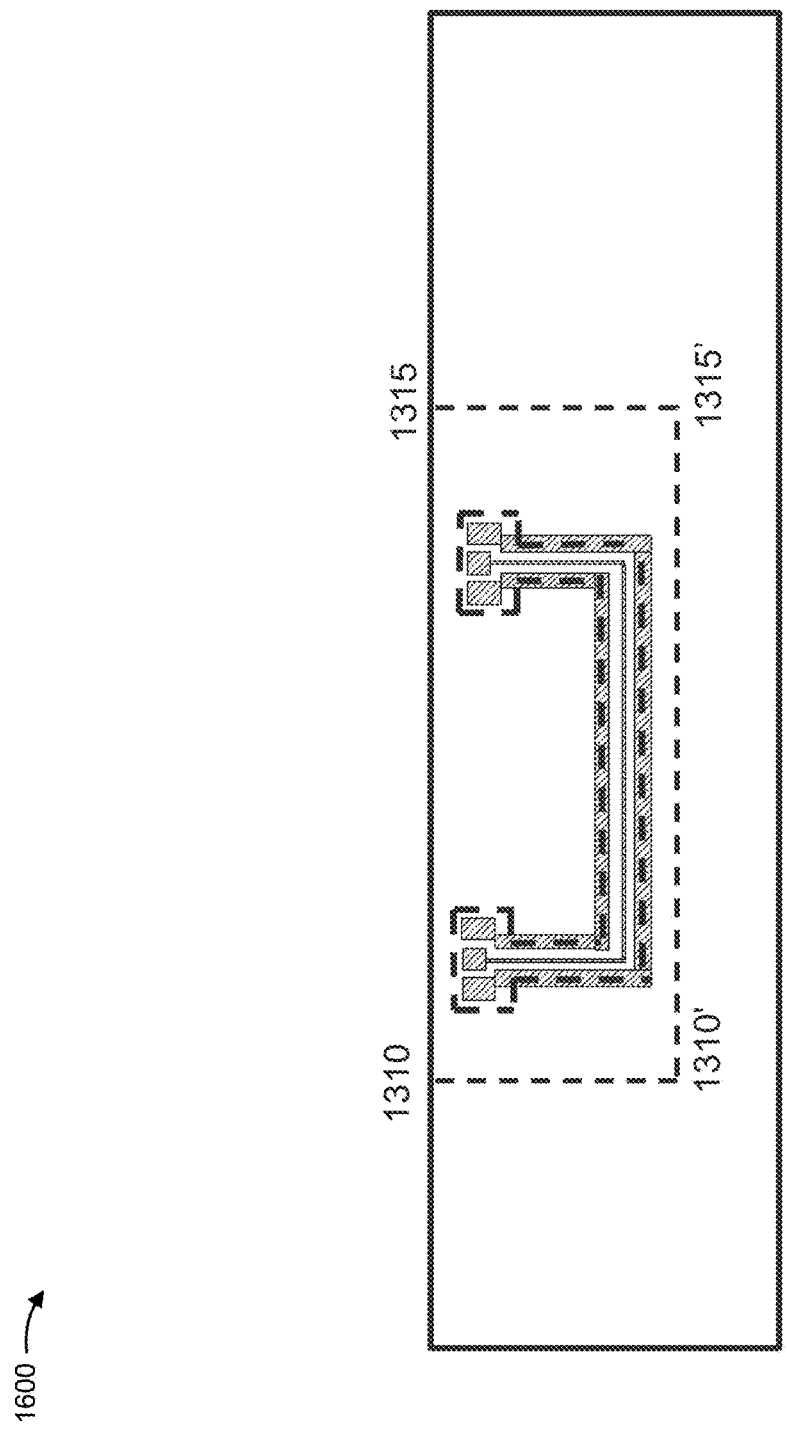

FIGS. 15 and 16 are diagrams of example implementations 1500-1600. FIGS. 15 and 16 show an example of other configurations of a partially laminated optical modulator.

As shown in FIG. 15, in a top down view, the laminated, second region of the optical modulator may extend for an entire length of the optical modulator (e.g., from 1310/1315 at a first end of the optical modulator to 1310'/1315' at a second end of the optical modulator).

As shown in FIG. 16, in a top down view, the laminated, second region of the optical modulator may extend for only a portion of a length of the optical modulator (e.g., from 1310/1315 to 1310'/1315'). In this way, the optical modulator may provide improved mechanical rigidity relative to an optical modulator with a laminated region that extends for the whole length of the optical modulator.

As indicated above, FIGS. 15 and 16 are provided merely as examples. Other examples are possible and may differ from what was described with regard to FIGS. 15 and 16.

Figure 17:
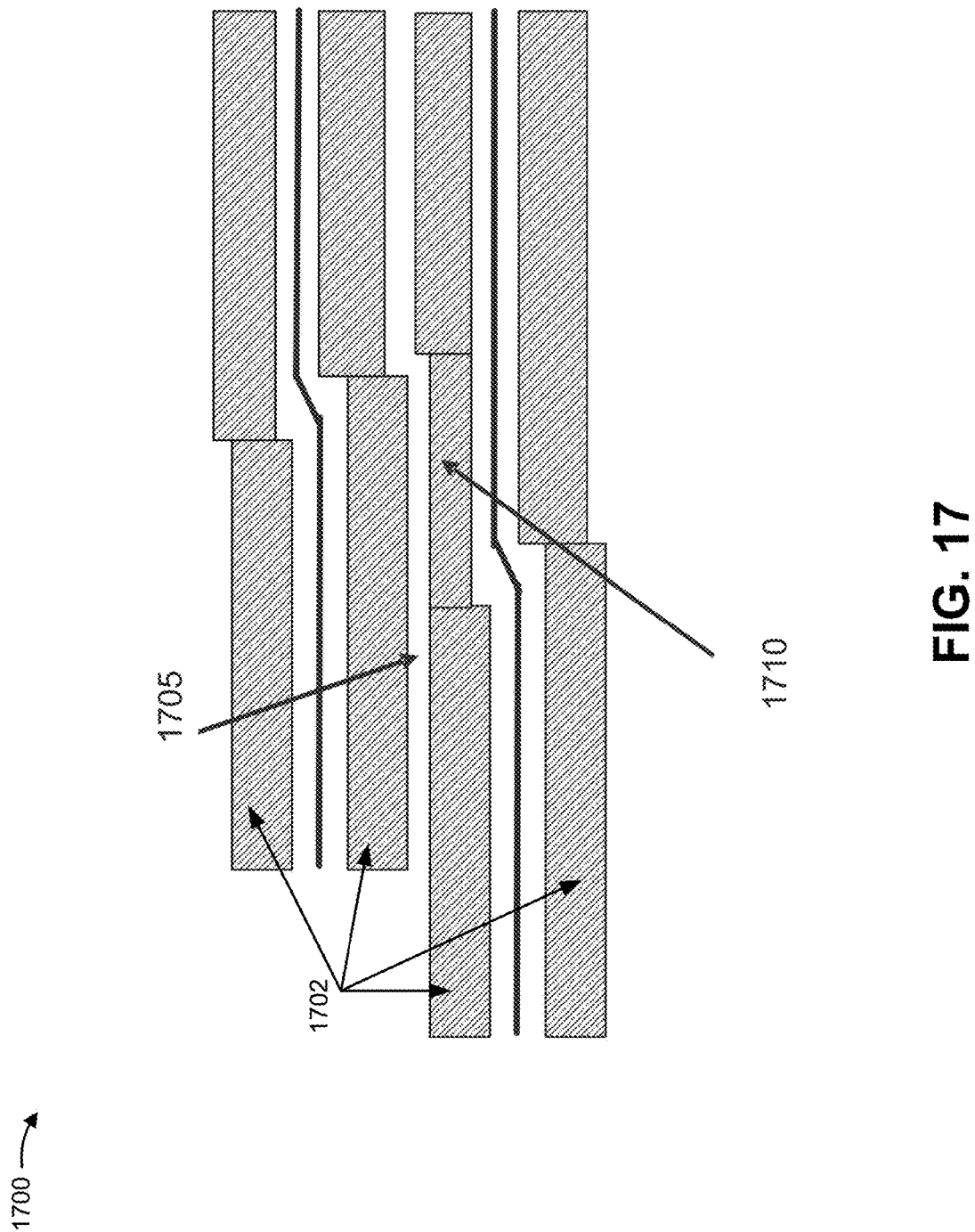
FIGS. 17-19 are diagrams of example implementations relating to ground electrode configurations for an optical modulator described herein.
Figure 18:
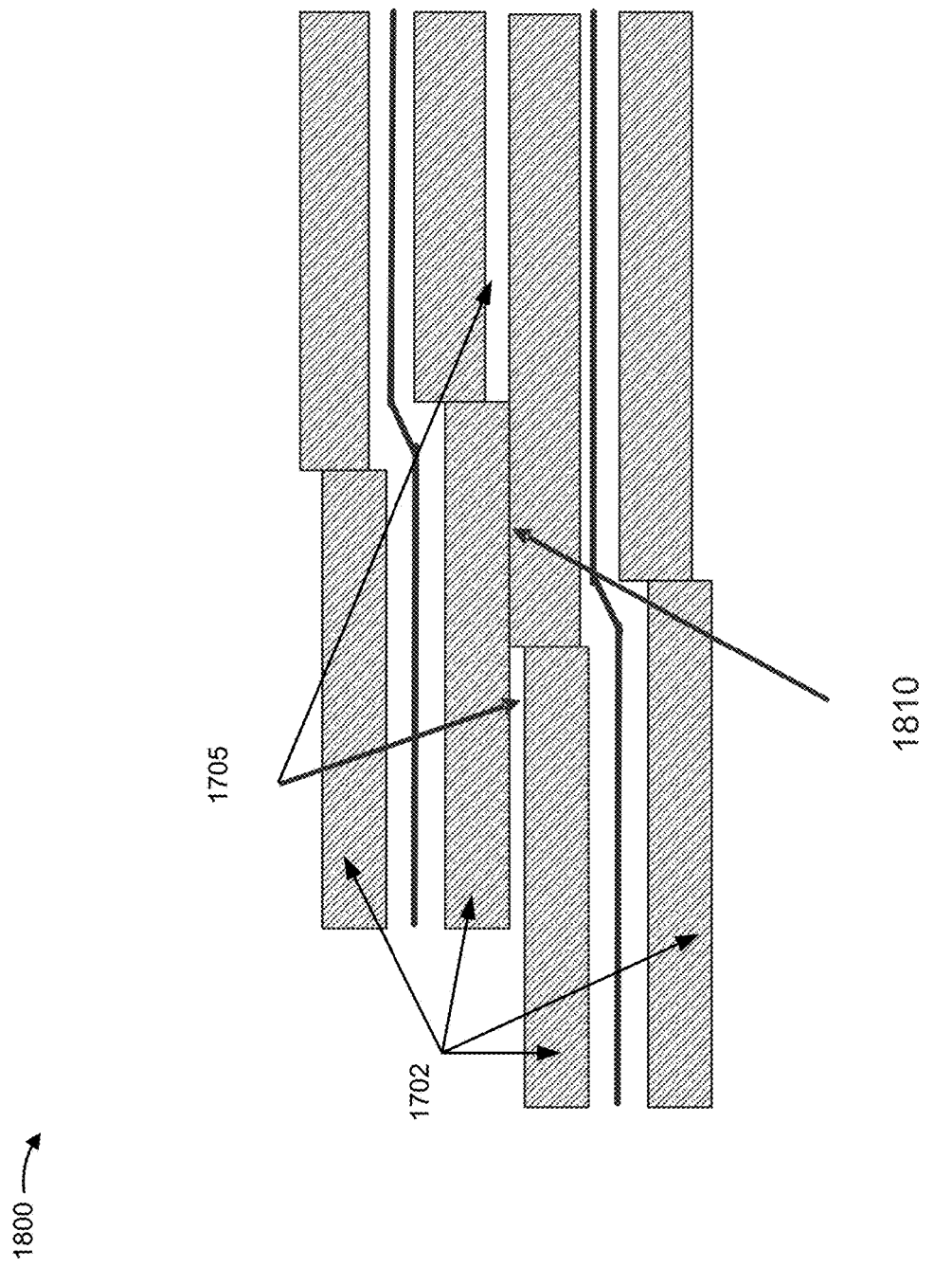
Figure 19:
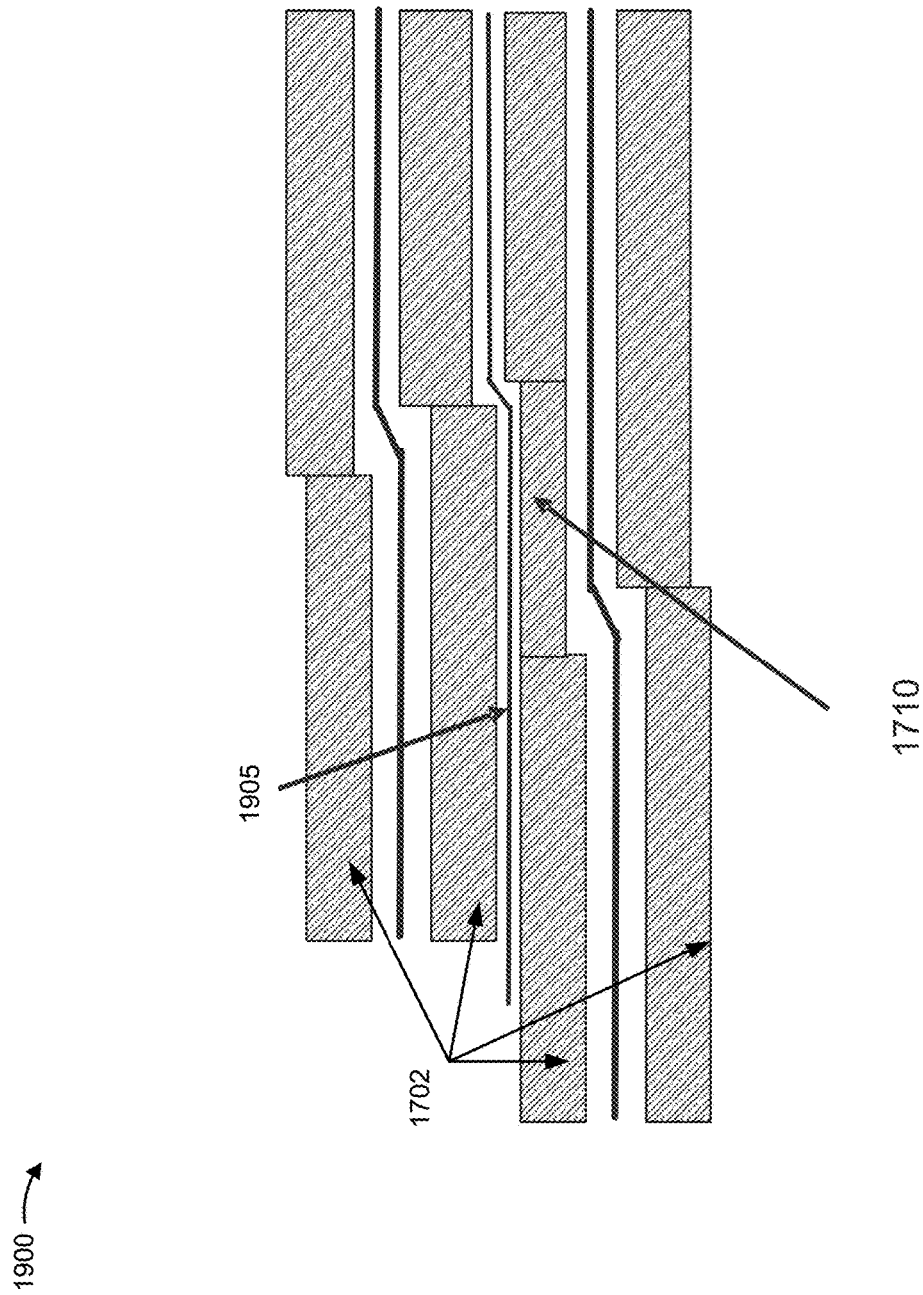

FIGS. 17-19 are diagrams of example implementations 1700-1900. FIGS. 17-19 show examples of ground electrode configurations for an optical modulator.

As shown in FIG. 17, the optical modulator may include two sets of ground electrodes 1702, which correspond to ground electrodes 115. The sets of ground electrodes 1702 may be separated by an electrode gap 1705. A first set of ground electrodes 1702 may include a narrowed ground electrode section 1710. For example, a particular ground electrode 115 may be associated with a first thickness for a first section and a second, reduced thickness for a second section. In this case, narrowed ground electrode section 1710 may enable a staggered lateral position shift for the sets of ground electrodes 1702. The staggered lateral position shift for the sets of ground electrodes 1702 may cause the sets of ground electrodes 1702 to have different longitudinal positions for a set of start points and a set of end points. In this way, an RF insertion loss may be reduced for the sets of 140ground electrodes 1702.

As used herein, and with regard to ground electrodes, signal electrodes, waveguides, and/or the like, the term "parallel" may refer to an orientation that is approximately parallel, such as a staggered lateral position shift orientation, a set of portions being approximately parallel (e.g., a first portion of a first ground electrode 1702 being parallel to a second portion of a second ground electrode 1702 for a portion of a length of each of the first ground electrode 1702 and the second ground electrode 1702), and/or the like. The term "parallel" may also refer to a relative orientation between electrodes or between electrodes and waveguides. For example, a ground electrode is parallel to a signal electrode over a substantial portion of a length between start and end points. As another example, in FIG. 19, the ground electrodes 1702 are parallel to the shielding ground electrodes 1905 with the exception of the portions where the shield ground electrodes 1905 have a jog (i.e. transition between different lateral positions) or a staggered lateral position shift.

Returning to FIG. 17, electrode gap 1705 is maintained, uninterrupted, from the start points to the end points for the sets of ground electrodes 1702 as each ground electrode 1702 shifts a lateral orientation along a length of each ground electrode 1702, thereby improving RF isolation relative to another configuration where adjacent ground electrodes 115 corresponding to adjacent ground electrodes 1702 of the sets of ground electrodes 1702 are merged for a portion of a length of the ground electrodes, as described herein.

In another example, a ground width of an RF ground on an opposite side of a signal electrode is reduced in width relative to the ground width shown in FIG. 17 to match a width of narrowed ground electrode section 1710, thereby maintaining symmetry about the RF signal electrode.

In another example, electrode gap 1705 may be filled with metallization that is thinner than the RF ground electrode. The thin metallization improves RF isolation at frequencies up to 30 gigahertz (GHz), but may introduce RF loss above 30 GHz, due to additional parallel-plate RF modes. In some implementations, the metallization may be gold, or of a metal or alternate material that introduces RF loss to RF modes. For example, the metallization may be nickel, chromium, TaN, or other material that is associated with less than a threshold conductivity at RF frequencies.

As shown in FIG. 18, electrode gap 1705 is interrupted for a portion of a length from the start points to the end points for the sets of ground electrodes 1702, resulting in a merged ground electrode section 1810. In this way, RF loss is reduced relative to maintaining electrode gap 1705, uninterrupted, for an entire length of ground electrodes 1702.

As shown in FIG. 19, a shielding grounding electrode 1905 may be disposed between sets of ground electrodes 1702. In this way, RF isolation is improved for the optical modulator relative to another configuration without a shielding grounding electrode 1905 disposed between sets of ground electrodes 1702. In some implementations, the shielding ground may be made of gold, or an alternate material that introduces RF loss to RF modes.

As indicated above, FIGS. 17-19 are provided merely as examples. Other examples are possible and may differ from what was described with regard to FIGS. 17-19.

Figure 20:
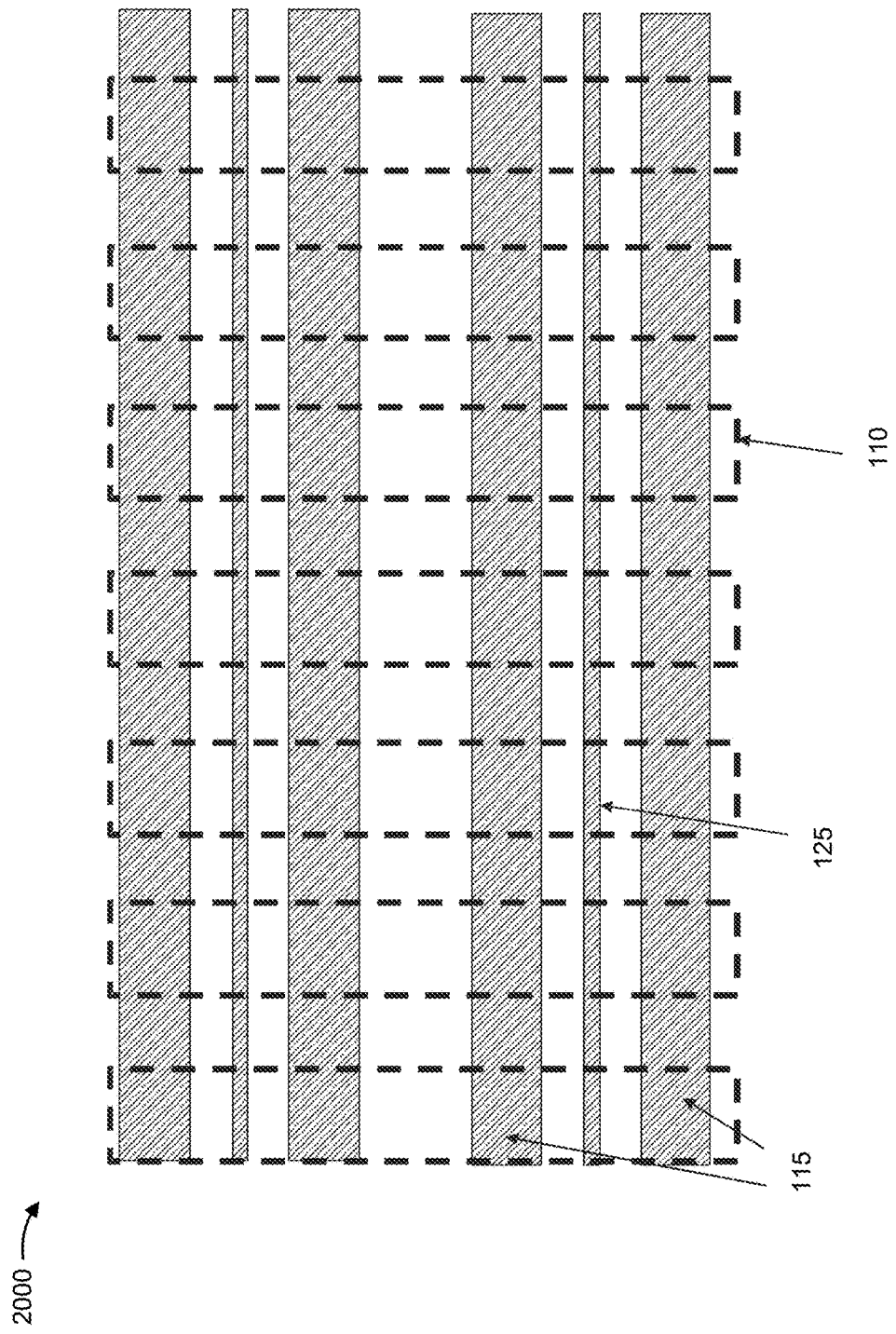
FIGS. 20-22 are diagrams of example implementations relating to segmented floating conductor configurations for an optical modulator described herein.
Figure 21:
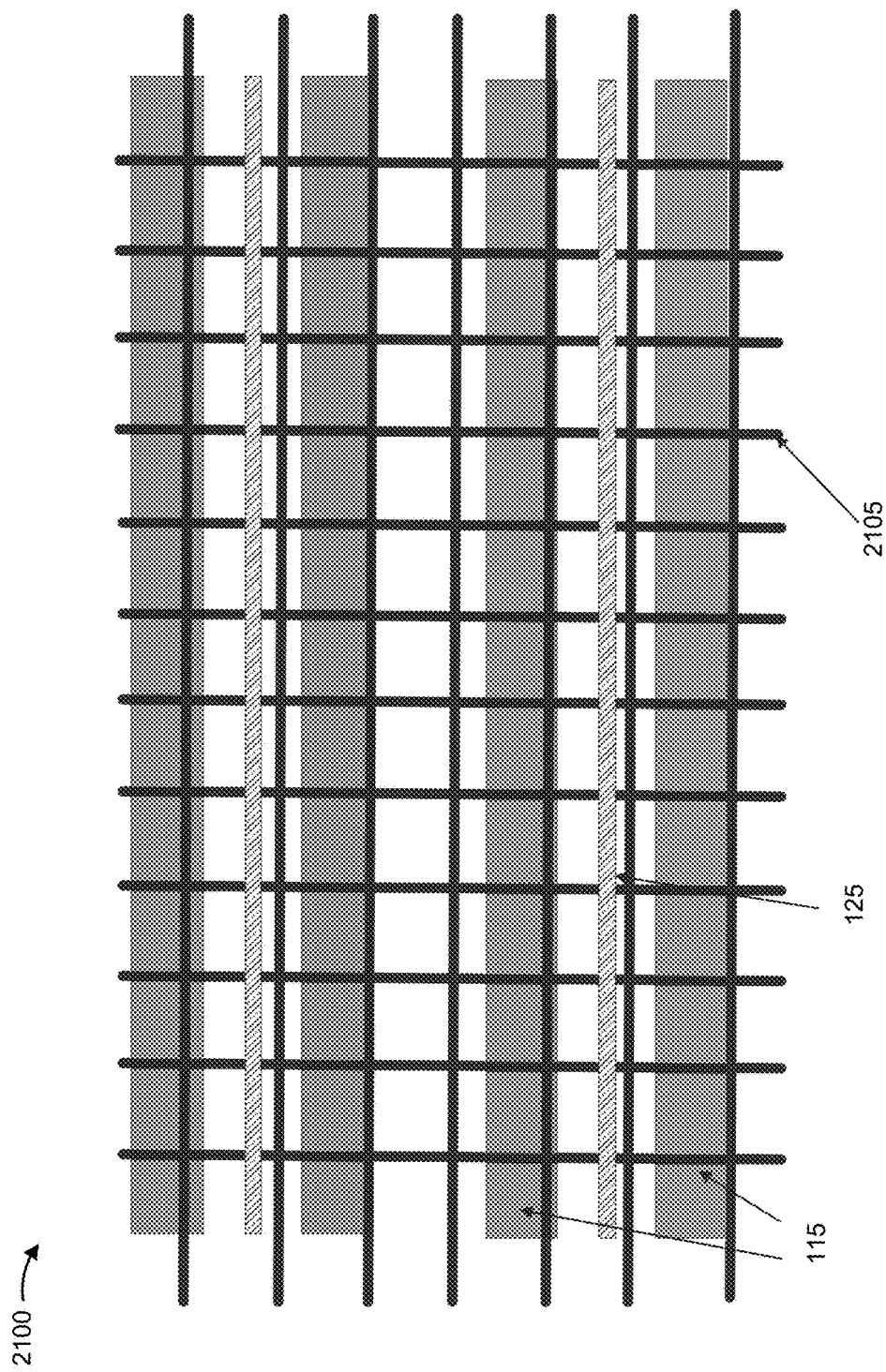
Figure 22:
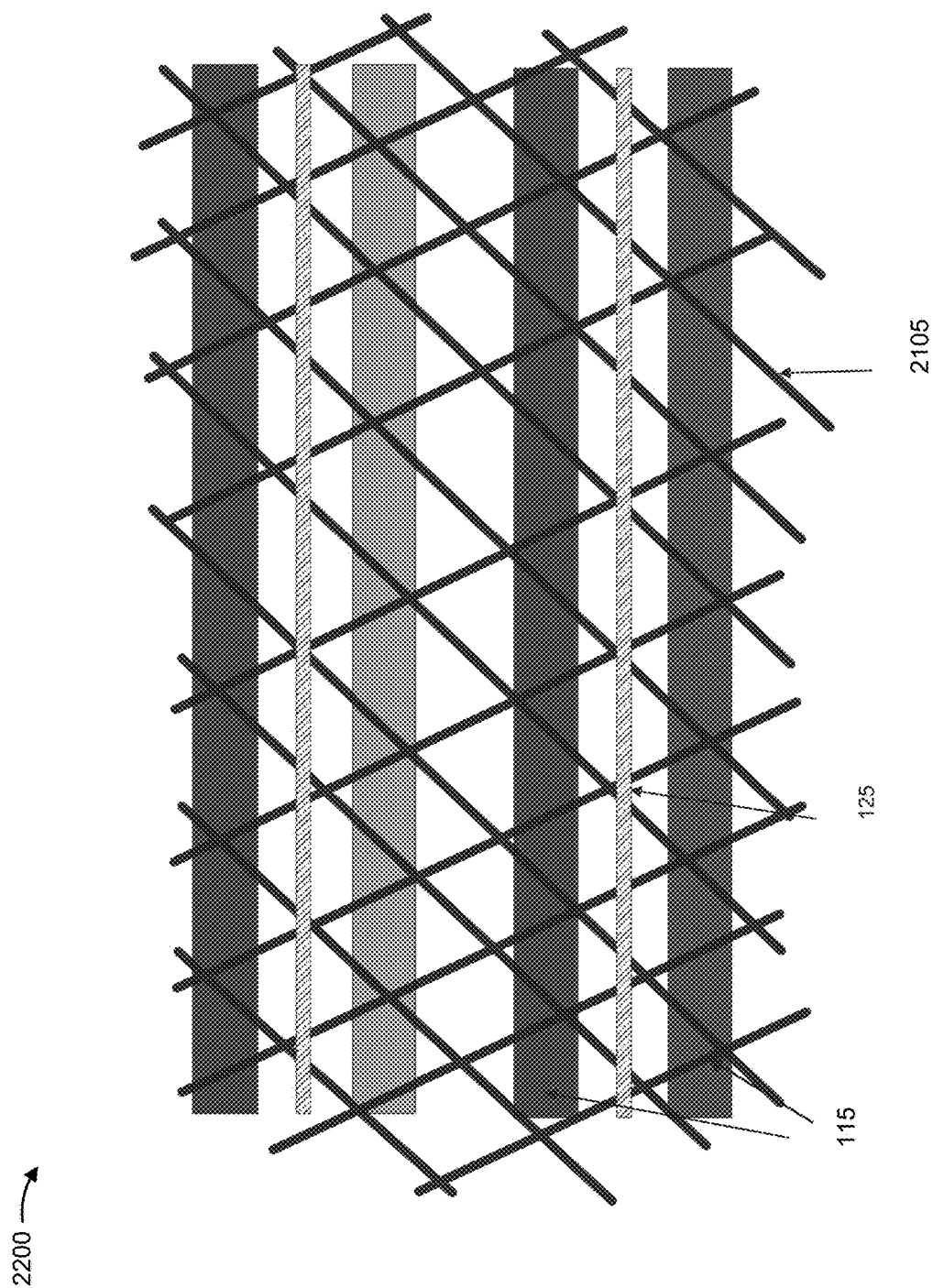

FIGS. 20-22 are diagrams of example implementations 2000-2200. FIGS. 20-22 show examples of an optical modulator with a segmented floating conductor 110.

As shown in FIG. 20, segments of floating conductor 110 may extend longitudinally and perpendicular to ground electrodes 115 and signal electrodes 125, which extend laterally along substrate 105 of the optical modulator. For example, segments of floating conductor 110 may be perpendicular to a fundamental mode propagation direction of fundamental modes excited in substrate 105 by waveguides 140. In this way, floating conductor 110 reduces propagation of dielectric RF modes and parallel-plate substrate RF modes, thereby reducing parasitic losses, relative to a non-segmented floating conductor 110. Moreover, segmentation of floating conductor 110 into multiple portions prevents RF currents from extending parallel to waveguides of the optical modulator, thereby improving performance of the optical modulator. Furthermore, a perpendicular arrangement of floating conductor 110 portions increases an alignment tolerance between floating conductor 110 and the planar waveguides, thereby reducing a difficulty of manufacture. In some implementations, a ground electrode or another type of conductor may extend laterally to connect each segment of floating conductor 110.

As shown in FIG. 21, a floating conductor grid 2105 extends longitudinally perpendicular to and laterally parallel to ground electrodes 115 and signal electrodes 125. Floating conductor grid 2105 may be a grid of floating conductor segments (i.e., segments of floating conductor 110). In this way, floating conductor grid 2105 prevents propagation of dielectric RF modes and parallel-plate substrate RF modes, thereby reducing parasitic losses relative to a non-segmented floating conductor 110. In some implementations, a ground electrode or another type of conductor may connect multiple segments of floating conductor grid 2105. Based on using a grid arrangement for floating conductor grid 2105, the optical modulator can be associated with an increased alignment tolerance between floating conductor grid 2105 and waveguides 140, thereby reducing a difficulty of manufacture.

As shown in FIG. 22, a floating conductor grid 2105 may be disposed offset to ground electrodes 115 and signal electrodes 125. For example, floating conductor grid 2105 is rotated relative to ground electrodes 115 and signal electrodes 125, such that floating conductor grid 2105 is aligned to be non-perpendicular and non-parallel to ground electrodes 115 and signal electrodes 125. In this case, rotating floating conductor grid 2105 relative to ground electrodes 115 and signal electrodes 125 may disrupt longitudinal RF currents from propagating in floating conductor grid 2105. In some implementations, floating conductor grid 2105 may be a non-orthogonal grid. For example, a first grid portion of floating conductor grid 2105 may intersect a second grid portion of floating conductor grid 2105 at an acute angle or an obtuse angle. In some implementations, a ground electrode or another type of conductor may connect portions of floating conductor grid 2105. In some implementations, portions of floating conductor grid 2105 may be disposed at irregular positions. For example, a set of random or pseudo-randomly selected positions and orientations may be selected for each portion of floating conductor grid 2105 to enable random or pseudo-random scattering of propagating substrate modes.

In some implementations, the floating conductors in FIGS. 20-22 may be made of gold, or an alternate material that introduces RF loss to RF modes.

As indicated above, FIGS. 20-22 are provided merely as examples. Other examples are possible and may differ from what was described with regard to FIGS. 20-22.

In this way, an optical modulator may include a floating conductor disposed between a substrate of the optical modulator and a carrier substrate of the optical modulator to enable the optical modulator to have less than a threshold effective thickness and greater than a threshold mechanical thickness. Based on configuration the optical modulator with an at least partially laminated substrate, the optical modulator may exhibit improved suppression of parasitic losses relative to another optical modulator without lamination (e.g., with a greater effective thickness) and improved mechanical rigidity relative to another optical modulator with a thinned substrate (e.g., with a lesser mechanical thickness).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical modulator, comprising:
   at least one ground electrode;
   at least one signal electrode parallel to the at least one ground electrode;
   at least one waveguide parallel to the at least one ground electrode and the at least one signal electrode;
   a first substrate disposed underneath the at least one ground electrode and the at least one signal electrode relative to a surface of the optical modulator;
   a second substrate disposed underneath at least a portion of the first substrate relative to the surface of the optical modulator; and
   a floating conductor grid including a plurality of floating conductor segments disposed between the first substrate and the second substrate,
      where the plurality of floating conductor segments includes one or more first floating conductor segments extending in a first direction and one or more second floating conductor segments extending in a second direction that is different from the first direction.

2. The optical modulator of claim 1, where
the one or more first floating conductor segments intersect with the one or more second floating conductor segments at an acute angle or an obtuse angle, and
where the floating conductor grid is a non-orthogonal grid.

3. The optical modulator of claim 1, where
the one or more first floating conductor segments intersect with the one or more second floating conductor segments at a right angle, and
where the floating conductor grid is an orthogonal grid.

4. The optical modulator of claim 1, where the floating conductor grid extends longitudinally perpendicular to and laterally parallel to the at least one ground electrode and the at least one signal electrode.

5. The optical modulator of claim 1, where the floating conductor grid is disposed offset to the at least one ground electrode and the at least one signal electrode, such that the floating conductor grid is aligned to be non-perpendicular and non-parallel to the at least one ground electrode and the at least one signal electrode.

6. The optical modulator of claim 1, where the first substrate, the second substrate, and the floating conductor grid form a laminated substrate.

7. The optical modulator of claim 1, where the at least one ground electrode includes a first set of ground electrodes corresponding to a first set of waveguides of the at least one waveguide and a second set of ground electrodes corresponding to a second set of waveguides of the at least one waveguide; and
where the floating conductor grid includes a first section disposed underneath the first set of ground electrodes relative to the surface of the optical modulator and a second section disposed underneath the second set of ground electrodes relative to the surface of the optical modulator,
where the first section and the second section are separated.

8. The optical modulator of claim 1, where
at least one floating conductor segment, of the plurality of floating conductor segments, extends perpendicular to a fundamental mode propagation direction for the at least one waveguide.

9. The optical modulator of claim 1, where
at least one floating conductor segment, of the plurality of floating conductor segments, extends parallel to a fundamental mode propagation direction for the at least one waveguide.

10. The optical modulator of claim 1, where
at least one floating conductor segment, of the plurality of floating conductor segments, extends non-perpendicular and non-parallel to a fundamental mode propagation direction for the at least one waveguide.

11. An optical modulator, comprising:
a laminated substrate including a plurality of waveguides disposed a threshold distance from a surface of the laminated substrate,
the laminated substrate including a conductor layer to suppress radio frequency (RF) dielectric modes and parallel-plate modes within the laminated substrate,
where the conductor layer is a floating conductor grid of floating conductor segments and the floating conductor segments are connected by a conductor;
a plurality of ground electrodes disposed on the surface of the laminated substrate; and
a plurality of signal electrodes disposed on the surface of the laminated substrate.

12. The optical modulator of claim 11, where the laminated substrate is a partially laminated substrate, and
where a portion of the laminated substrate is non-laminated.

13. The optical modulator of claim 11, where the laminated substrate is a completely laminated substrate.

14. The optical modulator of claim 11, where the floating conductor grid prevents propagation of dielectric radio frequency modes or parallel-plate substrate radio frequency modes.

15. The optical modulator of claim 11, where the floating conductor segments include a first floating conductor segment oriented in a first direction and a second floating conductor segment oriented in a second direction that is different from the first direction.

16. The optical modulator of claim 11, where the laminated substrate includes a substrate layer and a carrier layer; and
where the conductor layer is disposed onto the carrier layer, and
where the conductor layer and the carrier layer are adhered to the substrate layer such that an adhesive is between the conductor layer and the substrate layer.

17. The optical modulator of claim 11, where the laminated substrate includes a substrate layer and a carrier layer; and
where the conductor layer is disposed onto the substrate layer, and
where the conductor layer and the substrate layer are adhered to the carrier layer such that an adhesive is between the conductor layer and the carrier layer.

18. An optical modulator, comprising:
a set of ground electrodes;
a signal electrode corresponding to and parallel to the set of ground electrodes;
a set of waveguides corresponding to and parallel to the set of ground electrodes,
where a first waveguide, of the set of waveguides, is disposed underneath a ground electrode, of the set of ground electrodes, relative to a surface of the optical modulator, and
where a second waveguide, of the set of waveguides, is disposed underneath the signal electrode relative to the surface of the optical modulator;
a first substrate disposed underneath the set of ground electrodes and the signal electrode relative to the surface of the optical modulator;
a second substrate disposed underneath at least a portion of the first substrate relative to the surface of the optical modulator; and
a floating grid conductor layer including a plurality of intersecting floating conductor segments disposed between the first substrate and the second substrate.

19. The optical modulator of claim 18, where the floating grid conductor layer is not connected to a radio frequency (RF) ground.

20. The optical modulator of claim 18, where the floating grid conductor layer is associated with a ground path for a direct current or an alternating current associated with less than a threshold frequency.

* * * * *